US008387306B2

(12) United States Patent
Cink

(10) Patent No.: US 8,387,306 B2
(45) Date of Patent: Mar. 5, 2013

(54) METHOD OF MONITORING AND CONTROLLING TERMITES WITH HEAT-TREATED WOOD

(75) Inventor: James H. Cink, Ballwin, MO (US)

(73) Assignee: BASF Corporation, Florham Park, NJ (US)

( * ) Notice: Subject to any disclaimer, the term of this patent is extended or adjusted under 35 U.S.C. 154(b) by 631 days.

(21) Appl. No.: 11/770,379

(22) Filed: Jun. 28, 2007

(65) Prior Publication Data
US 2009/0000182 A1 Jan. 1, 2009

(51) Int. Cl.
*A01M 17/00* (2006.01)
(52) U.S. Cl. ............................................. 43/132.1
(58) Field of Classification Search ................ 43/132.1
See application file for complete search history.

(56) References Cited

U.S. PATENT DOCUMENTS

| | | |
|---|---|---|
| 4,208,828 A | 6/1980 | Hall et al. |
| 4,214,400 A | 7/1980 | Patmore et al. |
| 4,263,740 A | 4/1981 | Hemsarth et al. |
| 4,709,504 A | 12/1987 | Andric |
| 4,735,851 A * | 4/1988 | Dodson et al. ............... 428/326 |
| 4,794,724 A | 1/1989 | Peters |
| 4,837,969 A | 6/1989 | Demarest |
| 4,970,822 A | 11/1990 | Sherman |
| 5,406,743 A | 4/1995 | McSherry et al. |
| 5,572,825 A | 11/1996 | Gehret |
| 5,771,628 A | 6/1998 | Nobbs |
| 5,806,237 A | 9/1998 | Nelson |
| 5,815,982 A | 10/1998 | Garretson |
| 5,832,658 A | 11/1998 | Randon |
| 5,930,944 A | 8/1999 | Knuppel |
| 5,937,571 A | 8/1999 | Megargle et al. |
| 5,960,585 A | 10/1999 | Demarest et al. |
| 6,016,625 A | 1/2000 | Bishoff et al. |
| 6,021,901 A | 2/2000 | Wolfe |
| 6,058,646 A | 5/2000 | Bishoff et al. |
| 6,071,529 A | 6/2000 | Ballard et al. |
| 6,079,151 A | 6/2000 | Bishoff et al. |
| 6,088,950 A | 7/2000 | Jones |
| 6,195,934 B1 | 3/2001 | Megargle et al. |
| 6,219,961 B1 | 4/2001 | Ballard et al. |
| 6,233,865 B1 | 5/2001 | Curtis et al. |
| 6,235,301 B1 | 5/2001 | Ballard et al. |
| 6,298,597 B1 | 10/2001 | Koehler et al. |
| 6,370,814 B1 | 4/2002 | Curtis et al. |
| 6,375,243 B1 | 4/2002 | Bradley et al. |
| 6,397,517 B1 | 6/2002 | Leyerle et al. |

(Continued)

OTHER PUBLICATIONS

Smith, Ramsay et al., Formosan Subterranean Termite Resistance to Heat Treatment of Scots Pine and Norway Spruce, May 2003, The internation Research Group[ on Wood Preservation, IRG/WP 03-40264.*

(Continued)

*Primary Examiner* — Christopher P Ellis
(74) *Attorney, Agent, or Firm* — Armstrong Teasdale LLP

(57) ABSTRACT

In a method of monitoring and/or controlling termite populations in an area accessible to the termites a wood that has been heat-treated to a temperature of greater than about 150 degrees C. (302 degrees F.) is located in the area and monitored. A toxic bait may also be located in the area. In another method, a toxic bait that contains a toxicant and wood that has been heat-treated to a temperature of at least about 150 degrees C. (302 degrees F.) may be located in the area.

28 Claims, 22 Drawing Sheets

U.S. PATENT DOCUMENTS

| | | | |
|---|---|---|---|
| 6,416,752 | B1 | 7/2002 | Richardson et al. |
| 6,463,693 | B1 | 10/2002 | Weisner |
| 6,467,216 | B2 | 10/2002 | McManus et al. |
| 6,474,016 | B2 | 11/2002 | Snell et al. |
| D467,296 | S | 12/2002 | Chan |
| 6,497,070 | B1 | 12/2002 | Snell et al. |
| 6,502,348 | B2 | 1/2003 | Bernard |
| 6,532,696 | B2 | 3/2003 | Clark, III et al. |
| 6,543,182 | B2 | 4/2003 | Snell et al. |
| 6,581,325 | B2 | 6/2003 | Gordon |
| 6,584,728 | B2 | 7/2003 | Aesch, Jr. et al. |
| 6,606,816 | B2 | 8/2003 | Oi et al. |
| 6,606,817 | B2 | 8/2003 | Oi et al. |
| 6,615,535 | B2 | 9/2003 | Snell et al. |
| 6,618,983 | B1 | 9/2003 | Spragins |
| 6,637,150 | B1 | 10/2003 | Oi et al. |
| 6,681,518 | B2 | 1/2004 | Aesch, Jr. et al. |
| 6,716,421 | B2 | 4/2004 | Brode, III et al. |
| 6,792,713 | B2 | 9/2004 | Snell |
| 6,796,082 | B1 | 9/2004 | Duston et al. |
| 6,857,223 | B2 | 2/2005 | Su |
| 6,914,529 | B2 | 7/2005 | Barber et al. |
| 6,916,482 | B2 | 7/2005 | Ovington |
| 6,928,771 | B1 | 8/2005 | Tesh |
| 6,978,572 | B1 | 12/2005 | Bernklau et al. |
| D515,175 | S | 2/2006 | Mayo et al. |
| 7,086,196 | B2 | 8/2006 | Cink et al. |
| D539,867 | S | 4/2007 | Mediate |
| D548,971 | S | 8/2007 | Lin |
| D549,119 | S | 8/2007 | Becker |
| 7,377,072 | B2 | 5/2008 | Meier et al. |
| 2001/0025447 | A1 | 10/2001 | Nimocks |
| 2001/0054249 | A1 | 12/2001 | Baker |
| 2002/0144453 | A1* | 10/2002 | Su ................................. 43/124 |
| 2002/0189153 | A1 | 12/2002 | Clark |
| 2004/0261961 | A1* | 12/2004 | Aitta et al. ..................... 162/76 |
| 2006/0117645 | A1 | 6/2006 | Cink et al. |
| 2006/0207164 | A1 | 9/2006 | Pearson |
| 2006/0254123 | A1 | 11/2006 | Su |
| 2007/0256350 | A1 | 11/2007 | Cates |

OTHER PUBLICATIONS

About.com, http://composite.about.com/library/PR/2001/bltekes1.htm, May 2001.* http://www.ehow.com/about_6574048_don_t-termites-eat-cypress_.html.*

International Search Report for PCT/US 08/68185, dated Sep. 30, 2008, 2 pages.

* cited by examiner

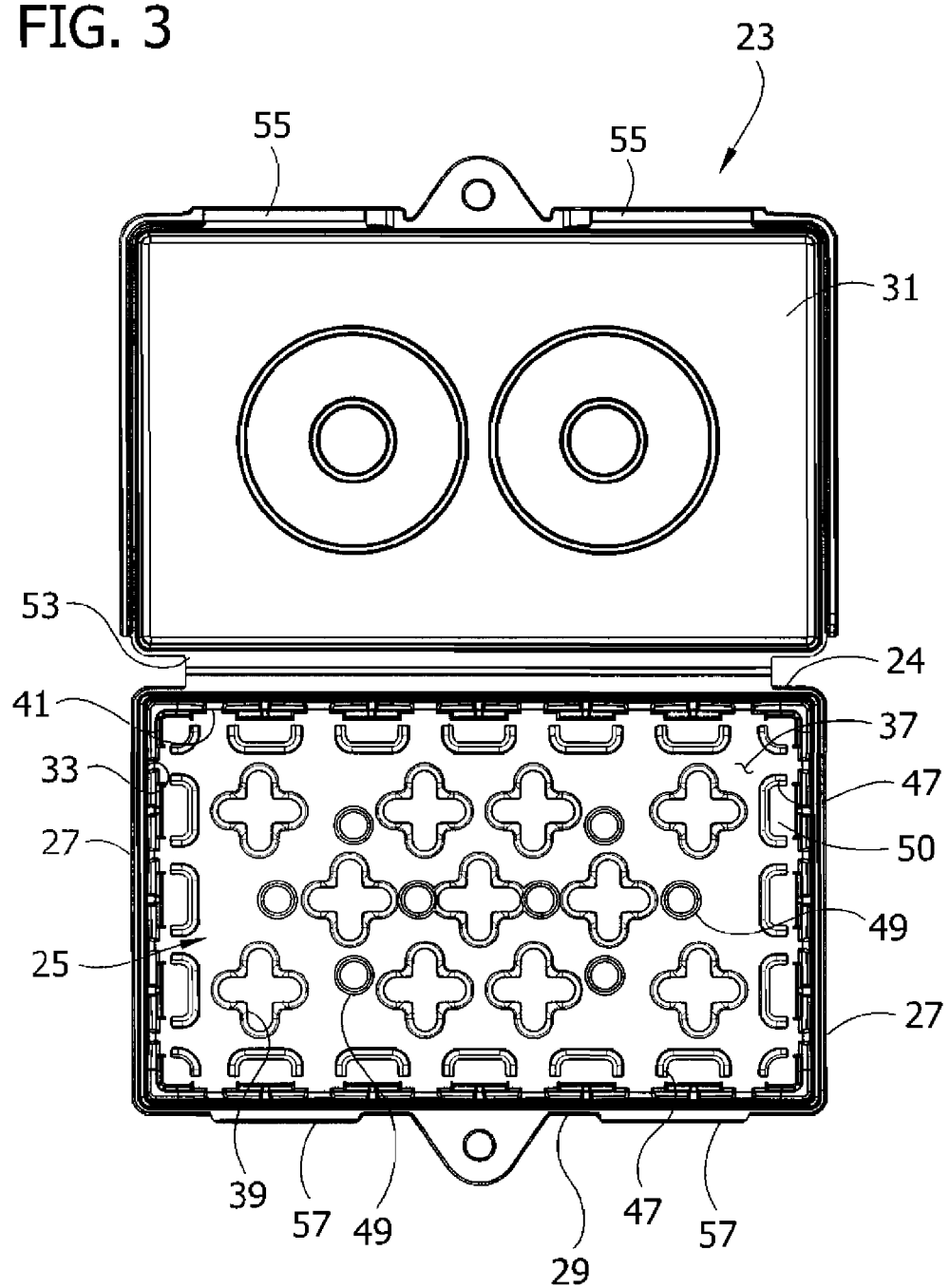

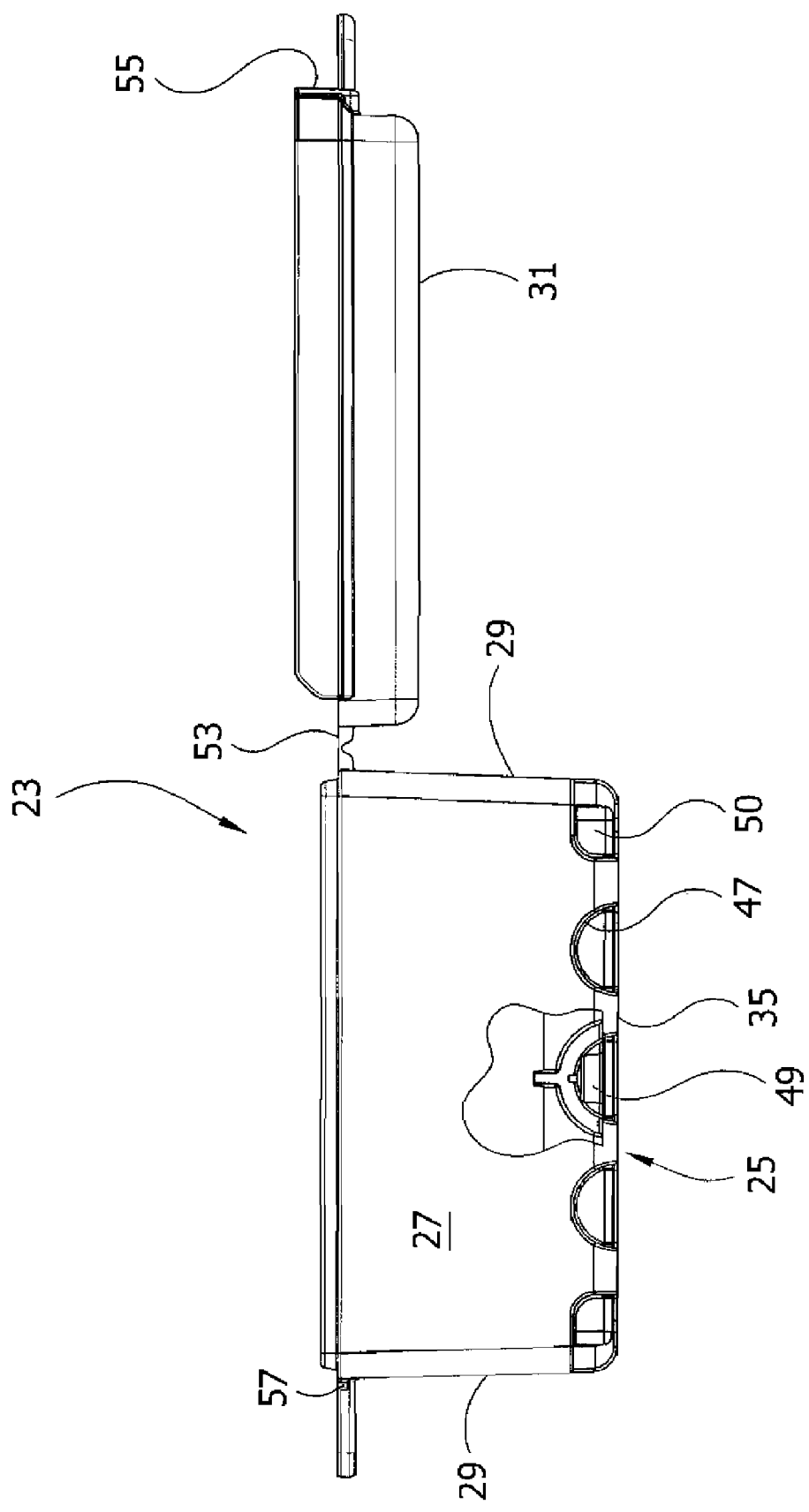

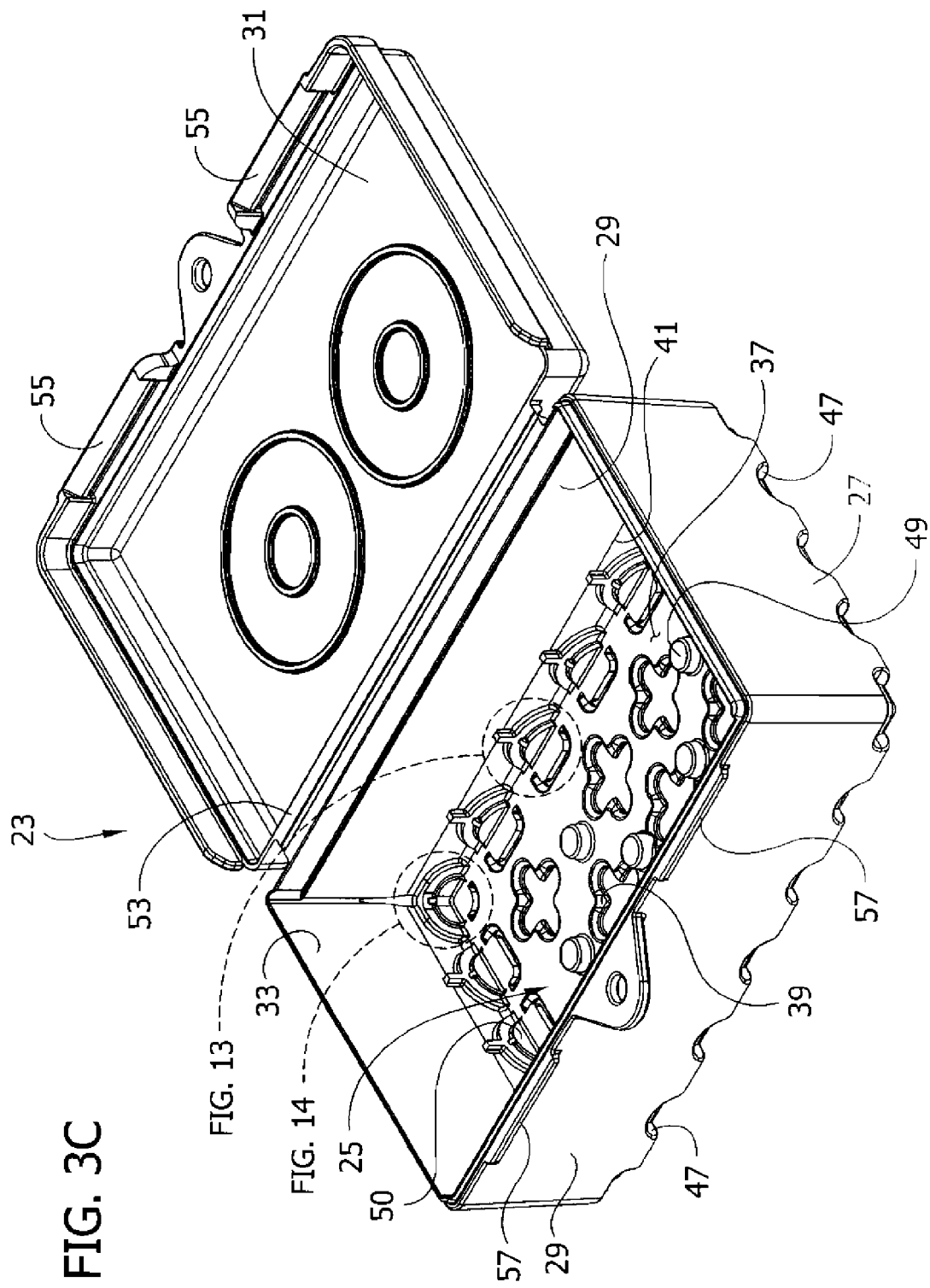

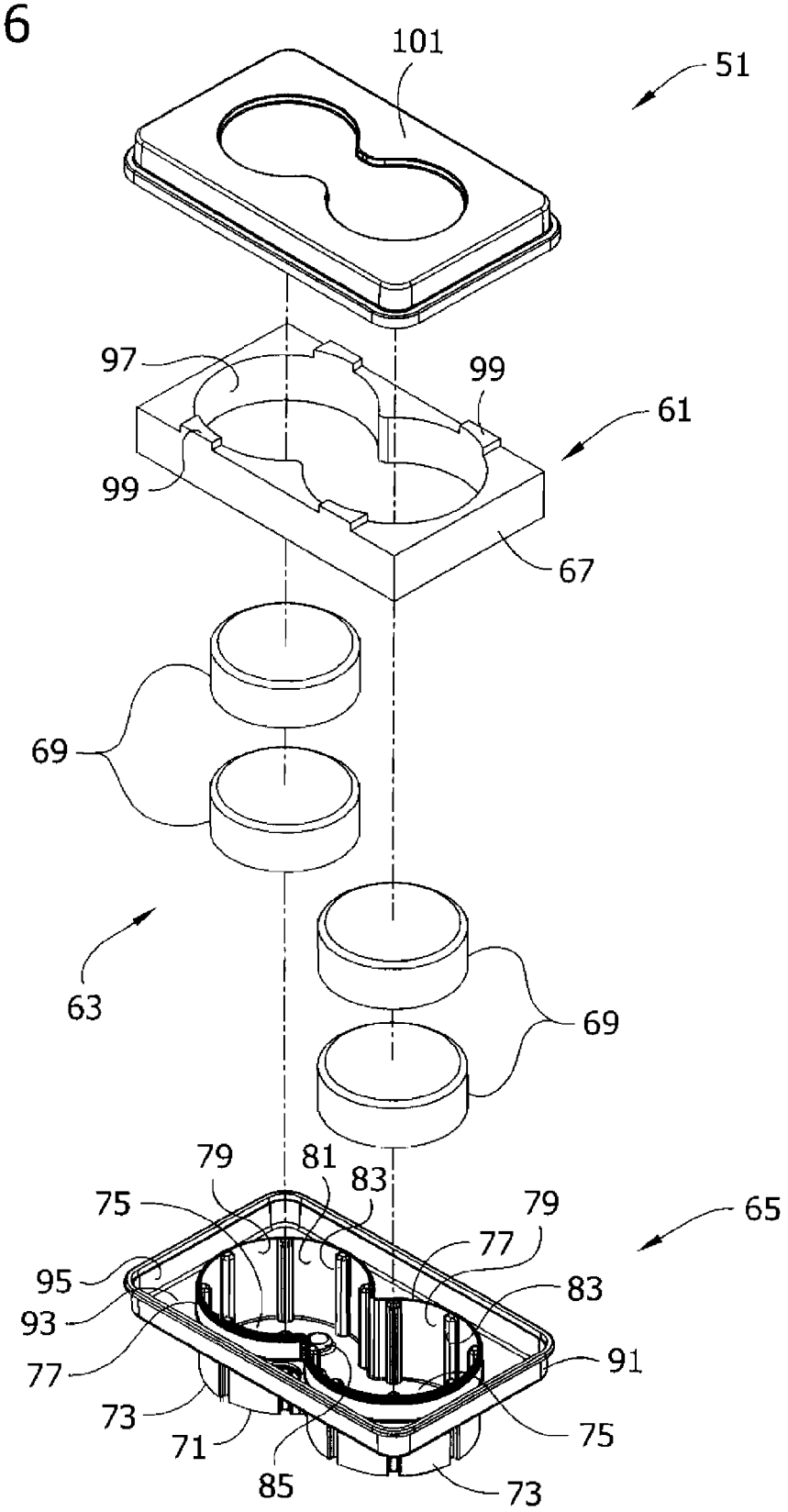

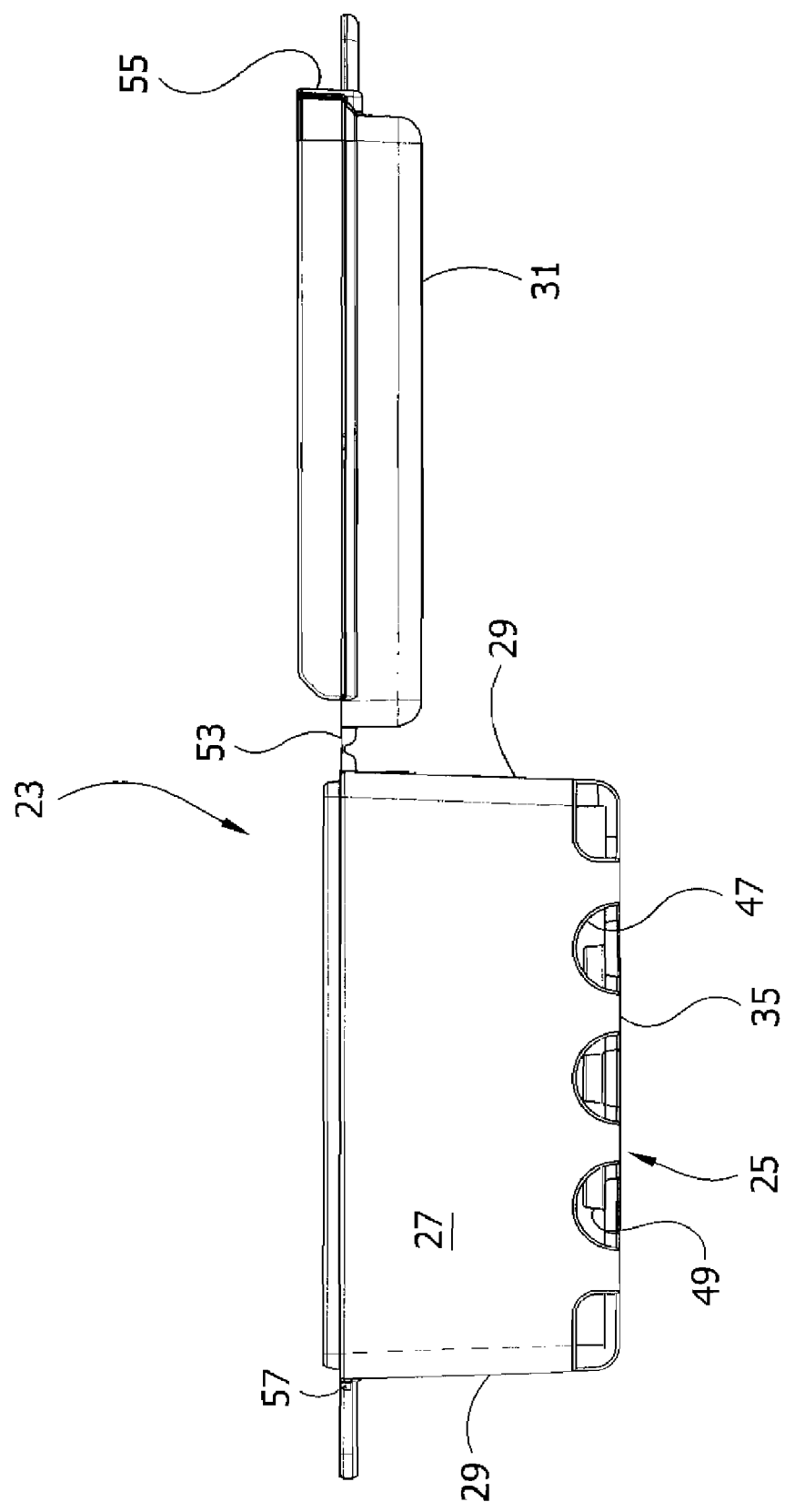

METHOD OF MONITORING AND CONTROLLING TERMITES WITH HEAT-TREATED WOOD

BACKGROUND

Drying wood is known in the field of wood preparation and preservation. There is a broad spectrum of processes that are utilized to dry wood. One such process occurs naturally to wood maintained at atmospheric conditions, such as with the aging of cut logs on a wood pile. This drying reduces the water content of the wood, while the wood remains susceptible to decay and cellular degeneration due to fungal pathogens, for example. Other drying techniques utilize heated chambers, such as kilns, maintained at elevated temperatures, such as those between about 40 degrees C. (105 degrees F.) and about 90 degrees C. (195 degrees F.), to more quickly dry wood. Wood dried in this manner is conventionally utilized as lumber, such as for construction projects and the like. Other conventional drying processes utilize high-temperature steam to dry wood at temperatures of between about 90 degrees C. (195 degrees F.) and about 150 degrees C. (302 degrees F.). This temperature level provides shorter drying times and more dimensionally-stable lumber, as compared with the previously discussed processes. Such conventional lumber is typically marketed for sale having a water content of between about 15 percent and about 18 percent. Once such lumber is in use in an ambient environment for some time, such as in a frame house, the wood has a water content of between about 10 percent and about 15 percent.

Another conventional wood drying process utilizes even more elevated temperatures, such as between about 150 degrees C. (302 degrees F.) and about 215 degrees C. (420 degrees F.) to alter the color of the wood itself. The upper limit on the heating can be higher than the 215 degrees C. (420 degrees F.) noted above, as long as the temperature remains below the charring temperature of the treated wood. Such processing is conventionally utilized to create the appearance of stained wood, without the use of chemical stains. Because such wood is superheated to elevated temperatures, much of the water content is removed from the wood, bringing water levels in the heat-treated wood to between about two percent and about ten percent. Although this process is known in the art of wood preparation and preservation, the wood product created by the process has not been used conventionally as a medium for monitoring or controlling termites. Moreover, conventional techniques and knowledge regarding termite monitoring and controlling teach that this wood would not be of use for monitoring and controlling termites. First, wood having a higher water content, such as between about 10 percent and about 20 percent is conventionally thought to be more attractive to termites. Second, heat-treating wood in this manner produces a heat-treated wood product that is less hygroscopic than untreated wood or wood dried at lower temperatures. As such, conventional wisdom regarding termite feeding would indicate that such wood would not be attractive to termites because even with additional water available (such as with a below ground installation), the heat-treated wood will resist the absorption of water. Without absorbing water, the conventional wisdom goes, the termites will not be interested in feeding.

In contrast with this conventional thinking regarding termite food selection and contrary to past understanding and teaching regarding termite wood preferences, the present invention utilizes such heat-treated wood with relatively lower levels of water and less hygroscopy than conventionally treated wood with unexpected success as a food source and attractant for termites. Additional benefits include enhanced resistance to microbiological attack and an increased amount of extractable compounds attractive to foraging termites. A termite monitoring and control method utilizing this heat-treated wood thus provides unexpected benefits over more conventional wood-based termite stations.

SUMMARY

A method of monitoring termite populations in an area accessible to the termites according to one embodiment generally comprises locating in the area a wood that has been heat-treated to a temperature of greater than about 150 degrees C. (302 degrees F.), and monitoring the heat-treated wood for the presence of termites.

In another embodiment, a method of monitoring and controlling termite populations in an area accessible to termites generally comprises locating in the area a wood that has been heat-treated to a temperature of at least about 150 degrees C. (302 degrees F.), and locating a toxic bait in the area.

In yet another embodiment, a method of controlling termite populations in an area accessible to termites generally comprises locating in the area a toxic bait comprising wood that has been heat-treated to a temperature of at least about 150 degrees C. (302 degrees F.) and a toxicant.

BRIEF DESCRIPTION OF THE DRAWINGS

FIG. 3 is a top plan view of the termite station container with the container lid in its open position;

FIG. 3A is a side elevation thereof, with an access tab removed from the container;

FIG. 3C is a top perspective view thereof;

FIG. 6 is an exploded perspective of the termite station cartridge of FIG. 5;

FIG. 15A is a side elevation thereof; and

DETAILED DESCRIPTION

Figure 1:
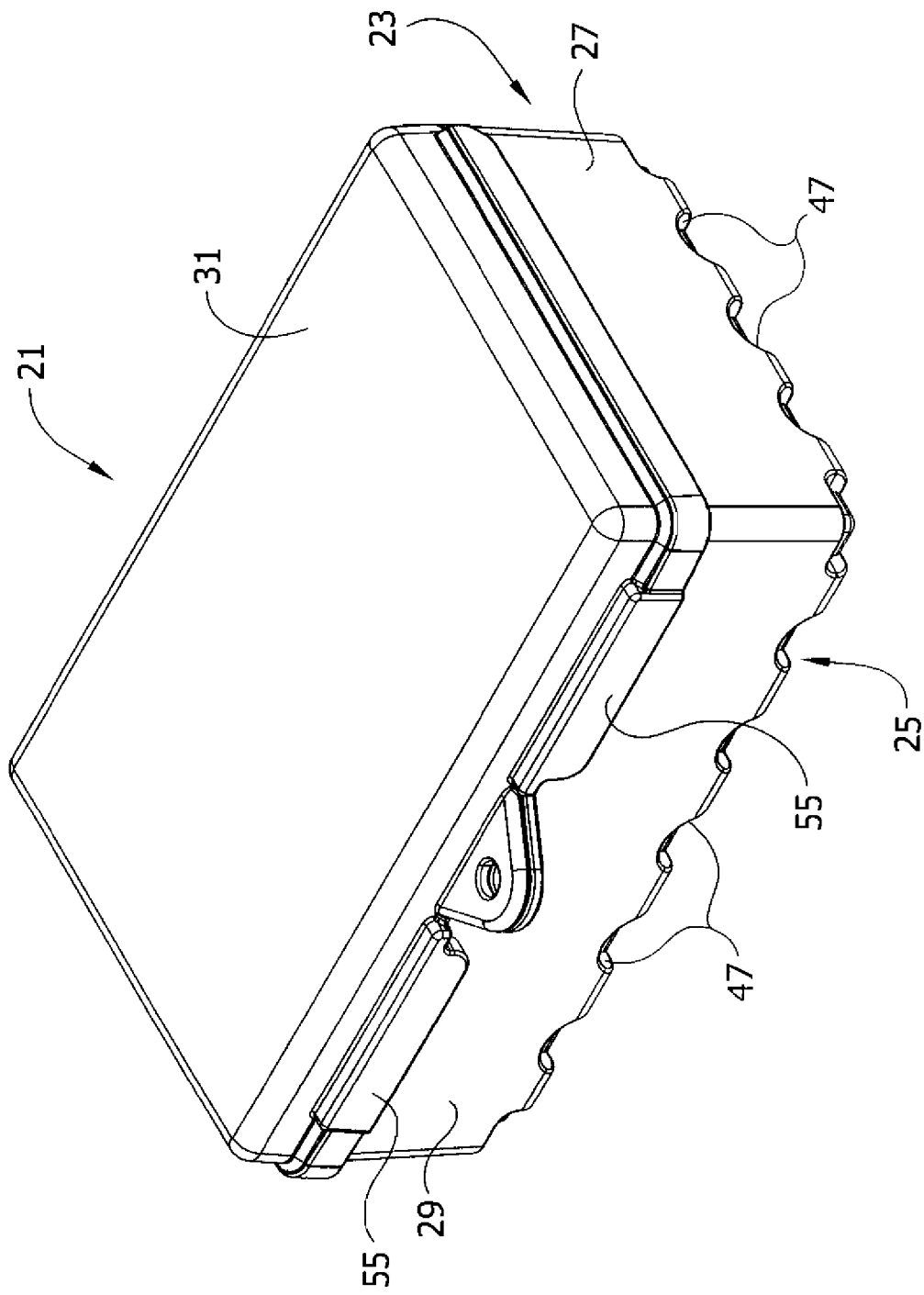
FIG. 1 is a perspective view of one embodiment of a termite station with a lid of a container of the termite station illustrated in a closed position of the lid.

With reference now to the drawings, and in particular to FIG. 1, one embodiment of a termite station is generally indicated at 21 and illustrated in the form of an above-ground termite station in what is referred to herein as a storage configuration, such as upon initial packaging or periods of non-use of the termite station. The termite station 21 of this embodiment is an above-ground termite station in that it is intended to be used above soil, such as by being secured on a suitable above-ground mounting surface including, without limitation, on top of soil, on a generally horizontal surface, a sloped surface or a vertical mounting surface (such as an interior or exterior wall of a house or building, a tree, a fence post or picket, and the like). The termite station 21 generally comprises a rectangular box-shaped container, indicated generally at 23, having a base panel 25 (or bottom panel in the orientation illustrated in FIG. 1, broadly referred to herein as a base of the container), longitudinally opposite end panels 27, laterally opposite side panels 29 and a lid 31 (broadly, a closure) together defining an interior space 33 (FIG. 3) of the container. The end panels 27 and side panels 29 of the illustrated embodiment together broadly define what is referred to herein as a side of the container 23. Accordingly, it is understood that the container 23 may be other than rectangular box-shaped, such as cylindrical (which would have a generally annular side) or another suitable shape, as long as the base panel 25, the side and the lid 31 are configured and arranged to together define the interior space 33 of the container.

The base panel 25 suitably has an outer surface 35 (FIG. 4) that faces a mounting surface M (FIG. 10) upon which the termite station is mounted, and an inner surface 37 (FIG. 3) that faces inward of the container and in part defines the interior space 33 of the container. The illustrated base panel 25 is rectangular and is suitably generally flat, or planar, so that substantially the entire outer surface 35 of the base panel is in opposed and abutting relationship with the mounting surface M upon mounting of the termite station 21. It is understood, however, that the base panel 25 may be other than generally flat or planar such as by having a concave, convex or other non-planar configuration, so that less than the entire outer surface 35 of the base panel abuts against the mounting surface, without departing from the scope of this invention. The illustrated end panels 27 and side panels 29 are also flat, or planar and are oriented generally perpendicular to the base panel 25. Alternatively, the end panels 27 and/or the side panels 29 may be other than perpendicular to the base panel 25, such as angled outward or angled inward relative thereto, and may be other than flat, or planar. It is also contemplated that the end panels 27 and/or side panels 29 may be curved, such as concave or convex, or other non-planar configuration. In one suitable embodiment, the container 23 may be constructed of a durable material that is not preferentially fed upon by termites, such as, for example, an acrylic or high strength plastic. In another suitable embodiment the container 23 may be constructed of a biodegradable material that is not preferentially fed upon by termites, such as, for example, biopolymers derived from organic materials. In a particularly suitable embodiment the container 23 is substantially opaque, although it is understood that the container may instead be generally translucent or even transparent.

Figure 3B:
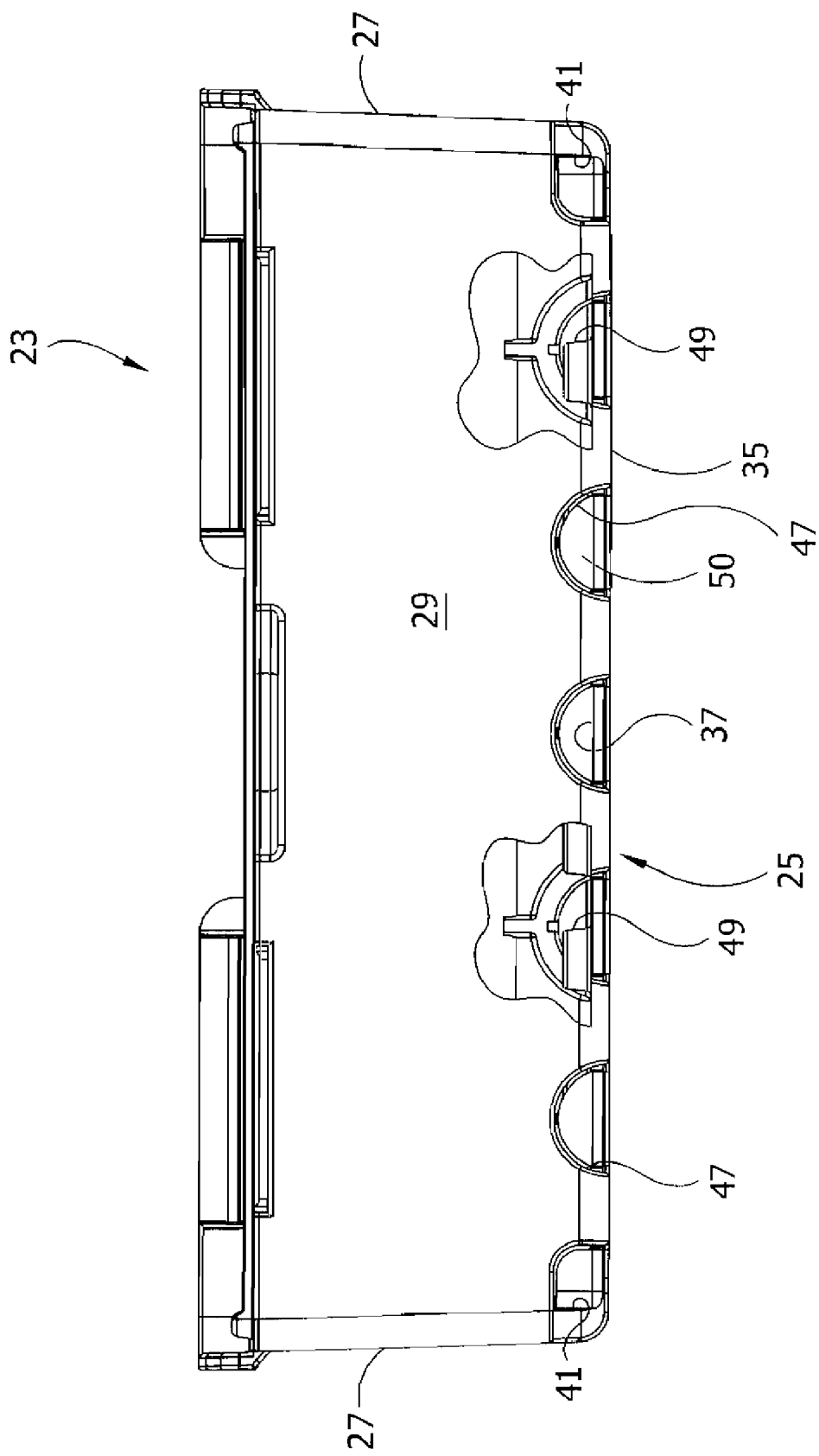
FIG. 3B is a front elevation thereof, with another access tab removed from the container.
Figure 4:
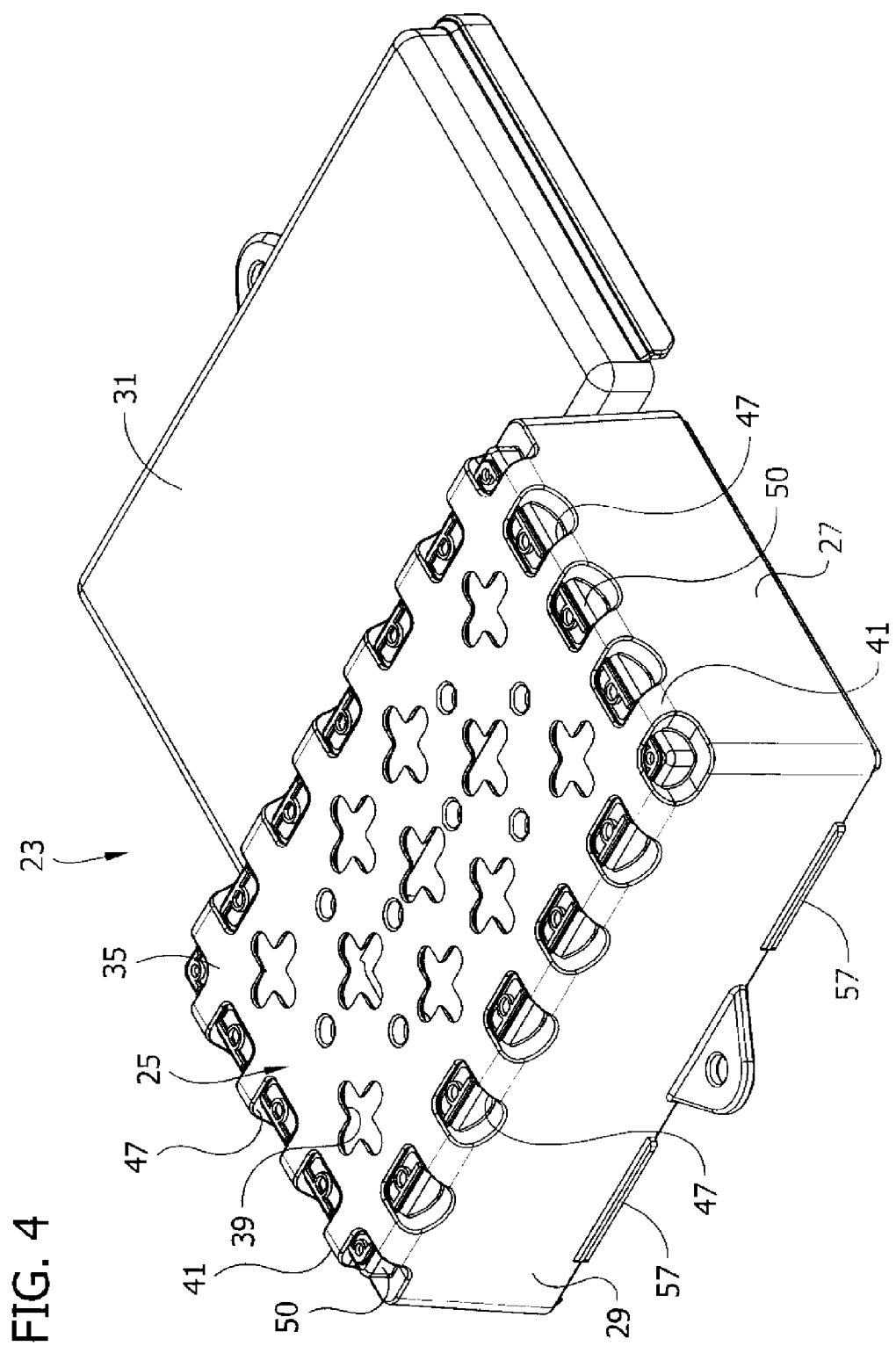
FIG. 4 is a bottom perspective view of the container of FIG. 3.
Figure 5:
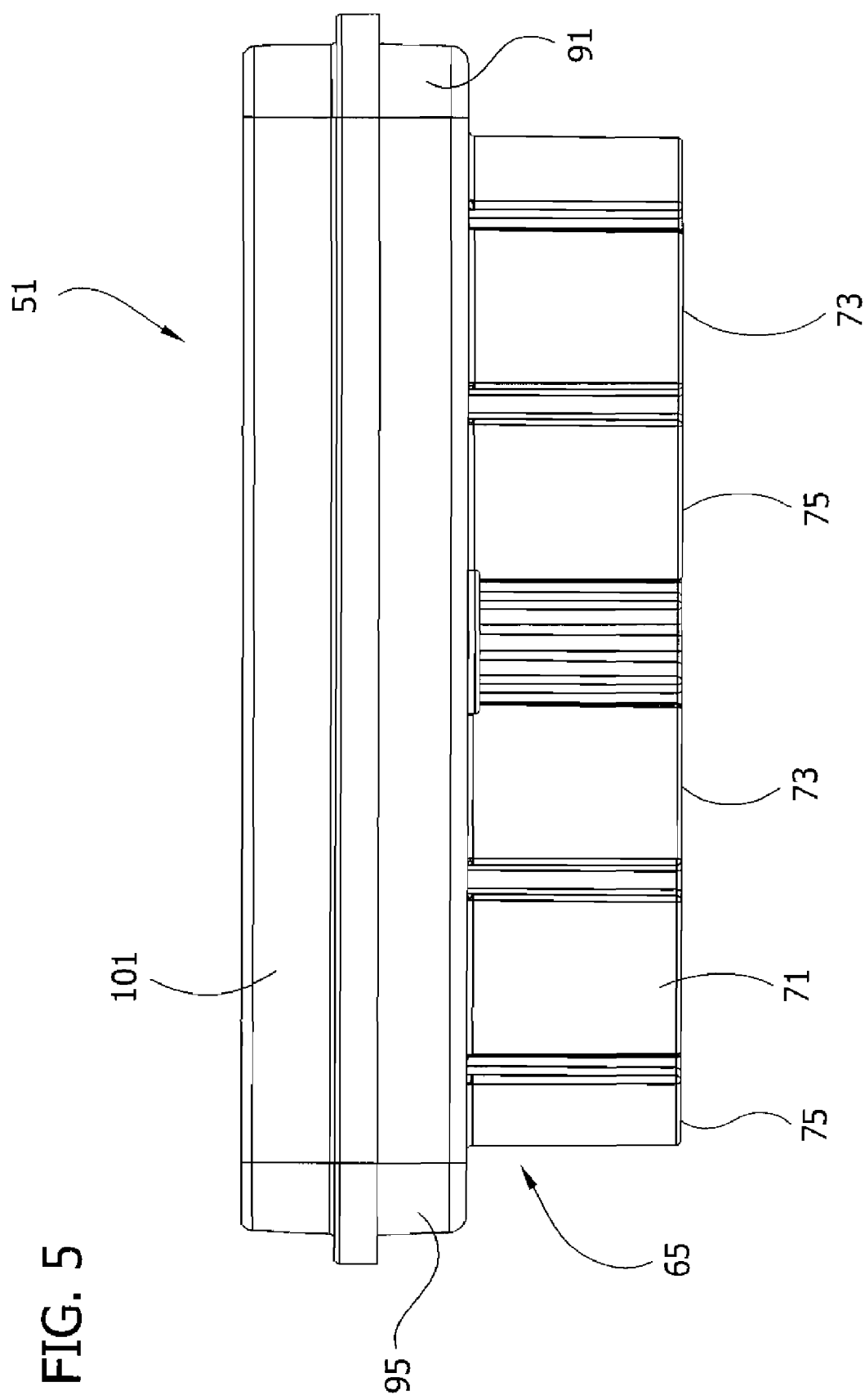
FIG. 5 is a front elevation of the termite station cartridge, with the cartridge removed from the container.
Figure 10:
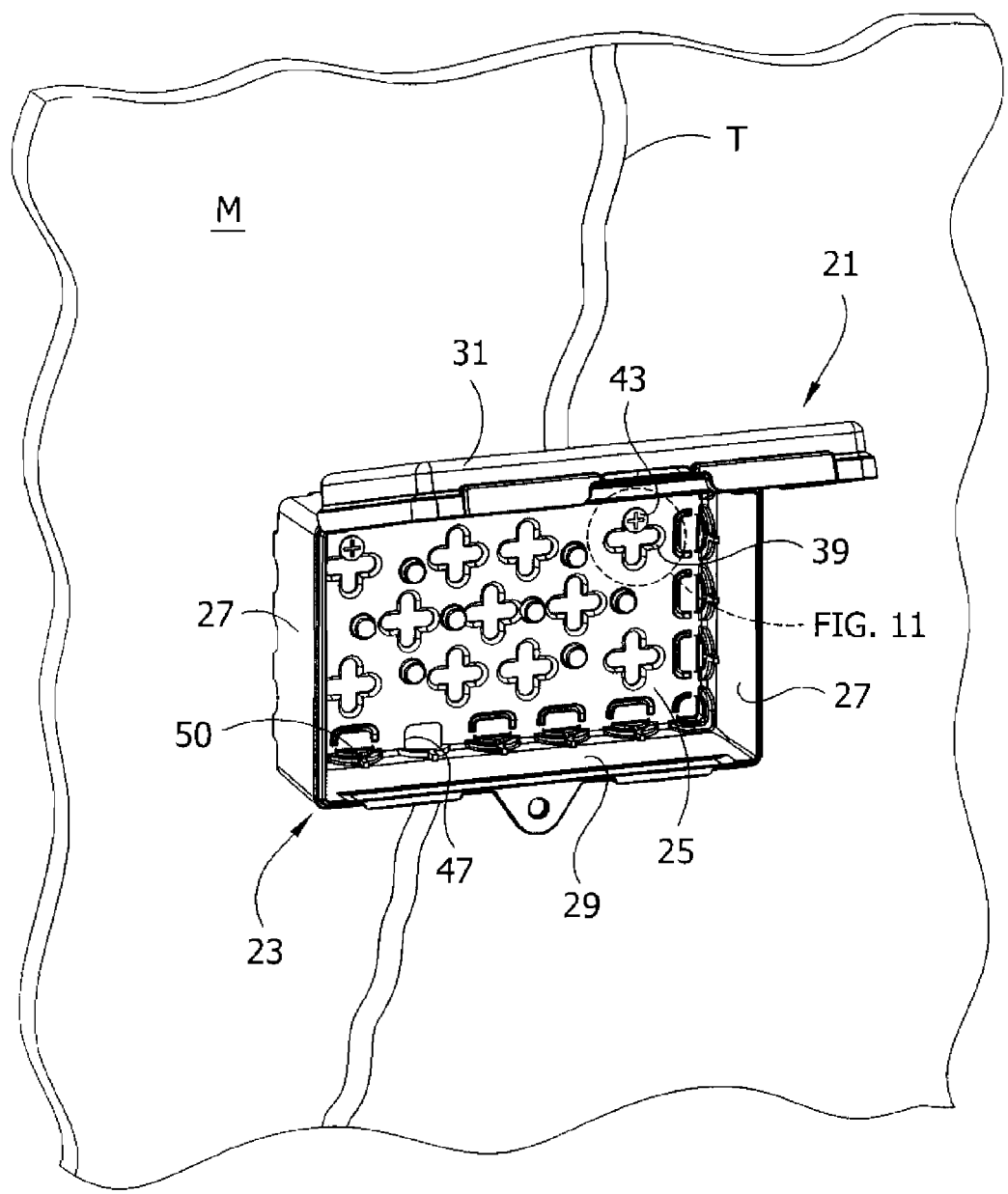
FIG. 10 is a perspective view of the termite station container (with the cartridge removed) fastened on a vertical mounting surface along a termite tunnel that extends up the mounting surface.

With particular reference to FIGS. 3, 4 and 10, the base panel 25 is more suitably configured to permit mounting of the base panel itself (and hence the termite station container 23), to the desired mounting surface M. For example, in the illustrated embodiment at least one and more suitably a plurality of openings 39 are formed in the base panel 25 in spaced relationship with, i.e., inward of, a peripheral edge 41 (FIG. 4) of the base panel (the "peripheral edge" of the base panel being defined as the intersection of the base panel with the side1, e.g., the end panels 27 and the side panels 29). As seen best in FIG. 11, the illustrated openings 39 each having a generally plus-sign or cross shape (i.e., comprised of intersecting elongate slots). However, it is contemplated that these openings 39 may be of any shape without departing from the scope of this invention. It is also contemplated that the openings 39 need not all be of the same shape. Eleven such openings 39 are formed in the base panel 25 of the illustrated embodiment, with one of the openings being centrally located (both longitudinally and laterally) in the base panel. While the spacing between all eleven openings 39 is non-uniform, it is understood that the spacing between the openings may instead be uniform. It is also understood that more or less than eleven openings 39 may be formed in the base panel 25, including a single opening. Additionally, where multiple openings 39 are present in the base panel 25, as in the illustrated embodiment, the pattern or arrangement of the openings may be other than that illustrated in FIGS. 3 and 4.

Figure 11:
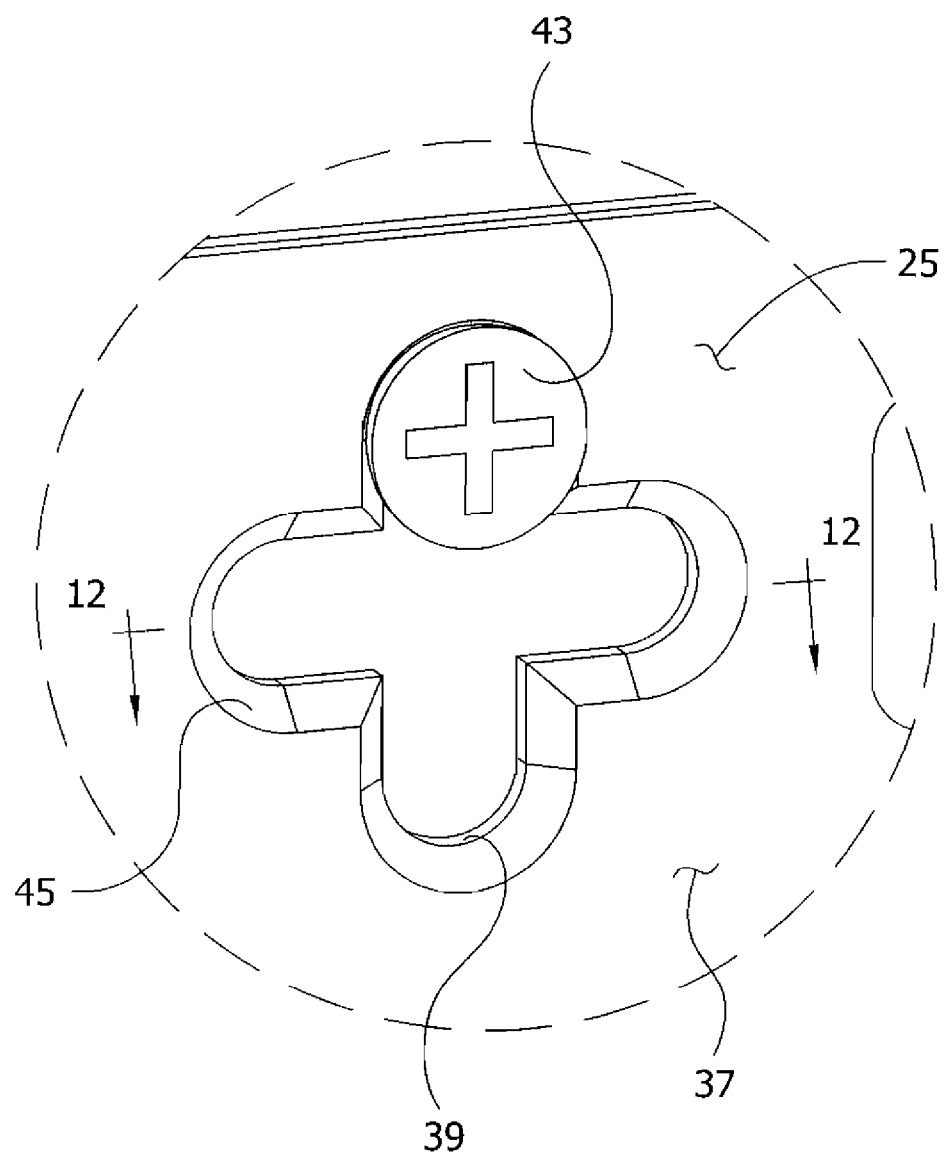
FIG. 11 is an enlarged top plan view of the encircled portion of FIG. 10.

These base panel openings 39 are used to mount the base panel 25 (and hence the container 23) on the mounting surface M using suitable fasteners such as screw fasteners 43 (FIG. 10) that extend in part through the openings and into the mounting surface. As illustrated in FIG. 11, each of the openings 39 is suitably sized in planar dimension (e.g., length and width, or diameter where the opening is circular) substantially larger than the cross-section of the shaft of the fastener 43 so that the fastener may extend through the opening along a relatively large fastener location range. The term "fastener location range" is intended herein to mean the length of open space along which the fastener 43 may be located in a particular direction within the opening 39. In one suitable embodiment, for example, the fastener location range provided by the opening 39 is at least about two times the maximum diameter of the shaft of the fastener (i.e. the portion that extends through the opening upon fastening the base panel on the mounting surface), more suitably at least three times the maximum diameter, and even more suitably at least about 4 times the maximum diameter. In other embodiments the fastener location range provided by the opening 39 is the range of about 2 to about 6 times the maximum diameter of the shaft of the fastener, more suitably in the range of about 3 to about 6 times and even more suitably in the range of about 4 to about 6 times the maximum diameter of the shaft of the fastener. In another example, the fastener location range provided by the opening 39 and fastener 43 illustrated in FIG. 11 is at least about 0.25 inches (about 6.35 mm), and is more suitably in the range of about 0.25 inches to about 1.25 inches.

Providing a plurality of such openings 39 in the base panel 25 allows the base panel (and hence the termite station 21) to be arranged at a desired location on the mounting surface M, such as with one or more of the openings located over an opening (not shown) formed by termites in the mounting surface, while providing sufficient additional openings through which fasteners 43 may extend through the base panel into the mounting surface at a more stable (e.g., less damaged) or stronger segment of the mounting surface. Thus, in such an embodiment the number of openings 39 exceeds the number of fasteners used to fasten the base panel on the mounting surface M by at least one. The openings 39 also allow the termite station 21 to be secured to the mounting surface M by passing the fasteners 43 through a single structural member of the container 23, i.e., the base panel 25, as opposed to multiple components thereof. For example, the lid 31 of the container 23 is free of openings that may otherwise be used as in the case with conventional designs because it is unnecessary for mounting fasteners to extend through the lid. This arrangement makes it easier to visually place the termite station 21, and in particular the base panel 25, in the desired location on the mounting surface M and also allows opening and closing of the lid 31 while the termite station remains mounted on the mounting surface, and in particular without having to loosen or remove the mounting fasteners.

Figure 12:
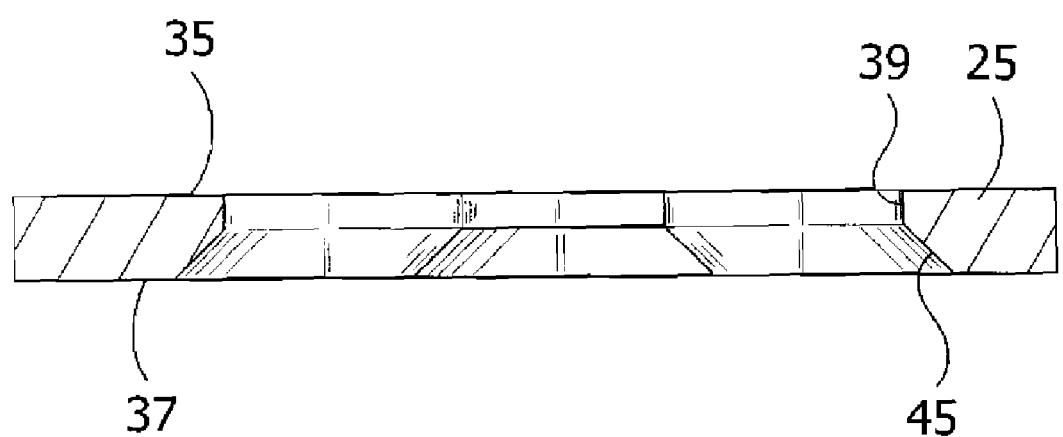
FIG. 12 is a cross-section taken in the plane of line 12-12 of FIG. 11.

The openings 39 in the base panel 25 also provide multiple entry points for the ingress and egress of termites to and from the interior space 33 of the container 31 through the base panel 25. To this end, the base panel is openings 39 are generally chamfered, or tapered outward (e.g., expanding in planar dimension) from the base panel outer surface 35 to the inner surface 37 thereof as illustrated in FIG. 12 so that the tapered portions act as entry ramps 45 into the interior space 33 of the container 23, thereby reducing or minimizing discontinuities encountered by termites entering the container. As an example, in one embodiment the tapered openings 39 define a ramp 45 angle from the outer surface 35 to the inner surface 37 of the base panel 25 in the range of about 15 to about 60 degrees, and more suitably of about 45 degrees.

Peripheral (i.e., side entry) openings 47 are formed in the end panels 27 and side panels 29 (i.e., broadly, the side) of the illustrated container 23 in spaced relationship with each other about the periphery of the container. More suitably, these peripheral openings 47 extend from the respective end panels 27 and side panels 29 to the base panel 25 (i.e., to the corners where the end panels and side panels meet the base panel), to allow termites to enter the interior space 33 of the container 23 from the sides thereof, such as along a termite tunnel formed along the mounting surface M (FIG. 10), instead of from behind the base panel (i.e., other than through the openings 39 formed in the base panel). In a particularly suitable embodiment, the peripheral openings 47 formed in the end panels 27 and side panels 29 continue into the base panel 25 so that termites that pass through the peripheral openings are disposed further within the interior space 33 of the container 23 before coming into contact with the container (i.e., with the base panel). However, it is not necessary that the peripheral openings 47 extend into the base panel 25 to remain within the scope of this invention. It is also contemplated that the base panel 25 may be chamfered or tapered where the peripheral openings 47 contact the base panel, such as in a manner similar to the tapered openings 39 formed in the base panel.

As best seen in FIGS. 3 and 4, the peripheral openings 47 formed in one end panel 27 are aligned with corresponding peripheral openings in the opposite end panel and peripheral openings in one side panel 29 are aligned with corresponding peripheral openings in the opposite side panel. The peripheral openings 47 formed in the side (e.g., the end and side panels 27, 29) of the container 23 allow the termite station 21 to be mounted on a mounting surface M along a termite tunnel T, such as by breaking the tunnel and placing the base panel 25 against the mounting surface within the broken away portions of the tunnel aligned with one or more of the peripheral openings as illustrated in FIG. 10. It is understood that the number of peripheral openings 47 provided in the container 23 may be more or less than that of the illustrated container 23, including only a single peripheral opening, without departing from the scope of this invention.

Figure 13:
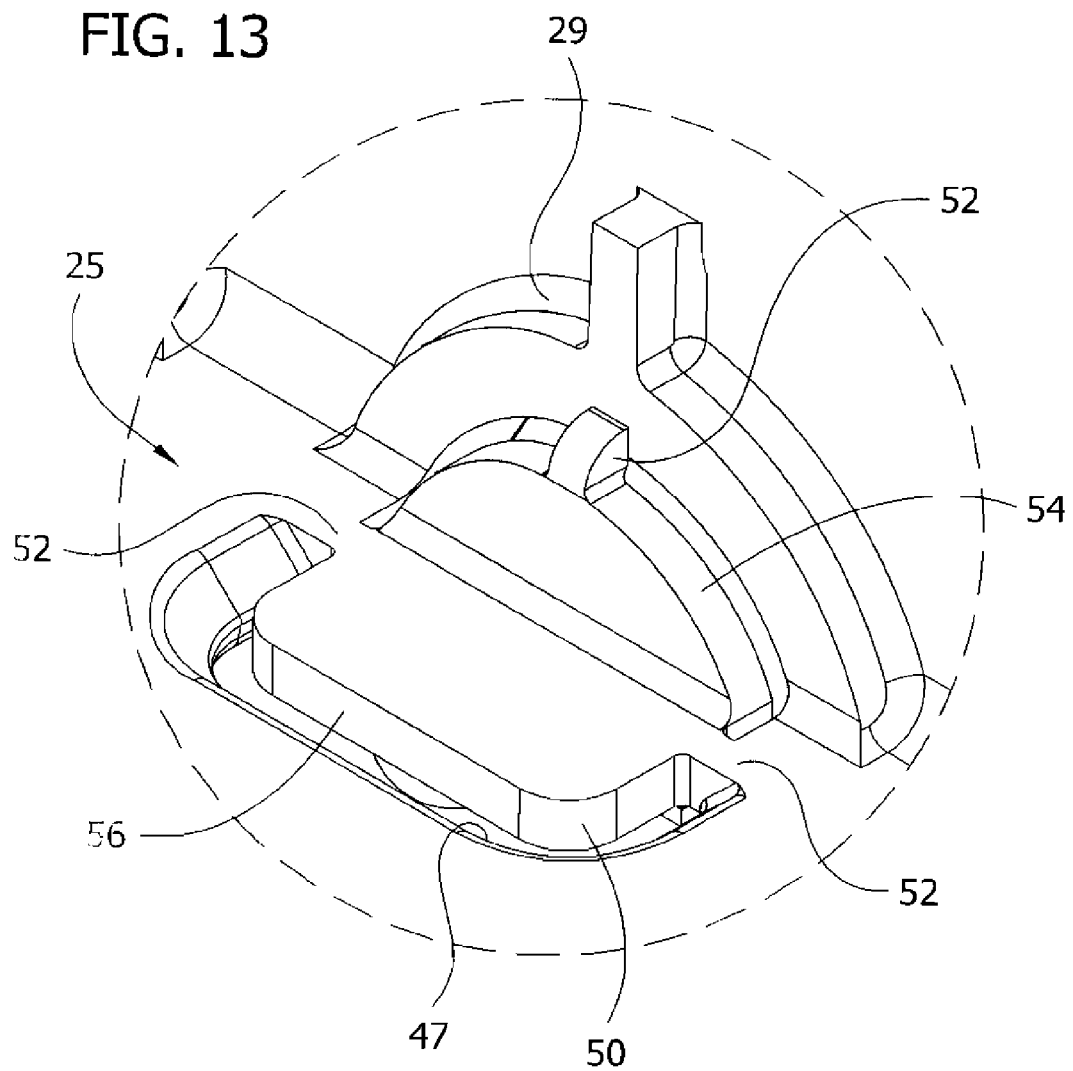
FIG. 13 is an enlarged view of a container opening and access tab located along a side of the container.
Figure 14:
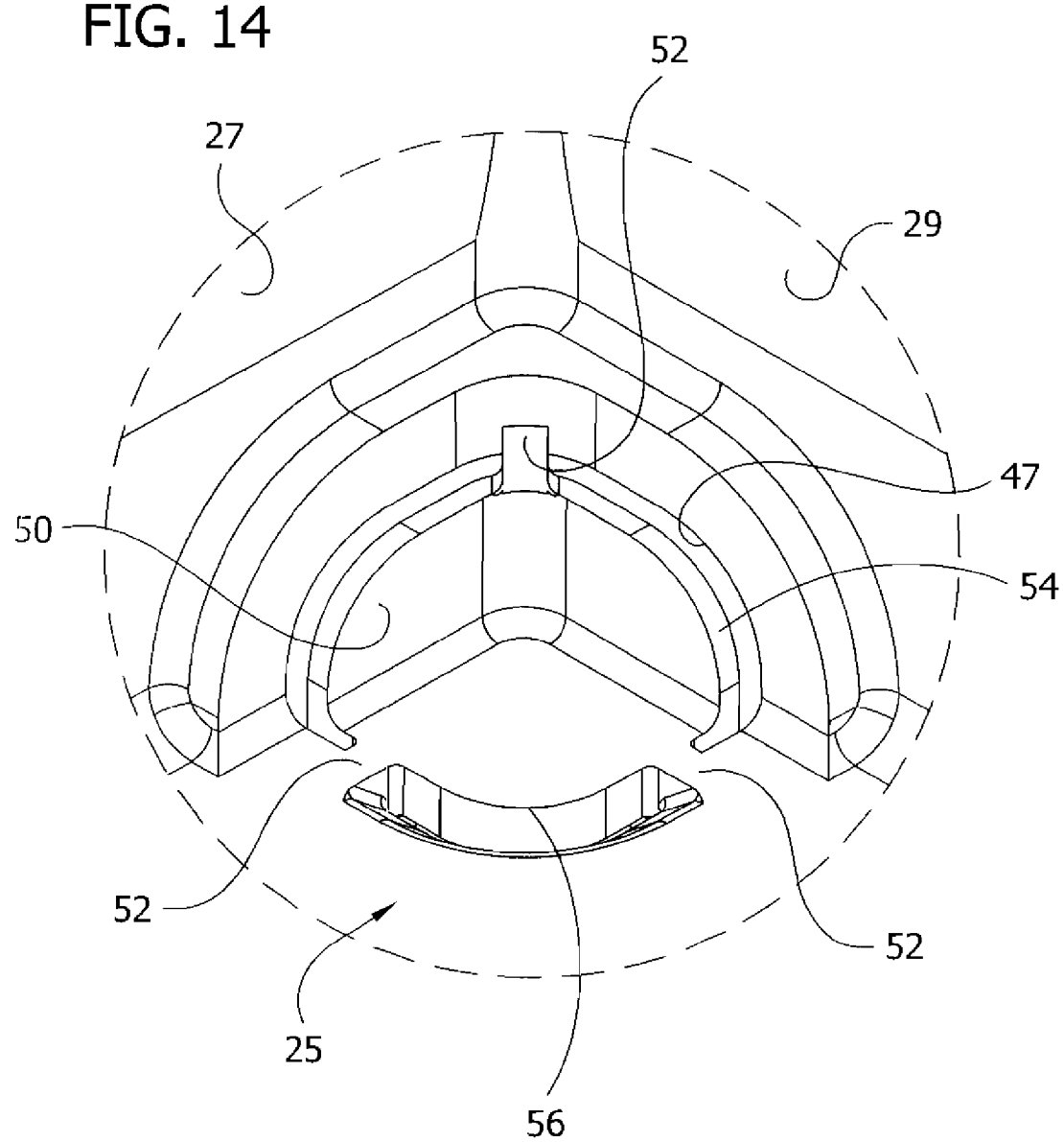
FIG. 14 is an enlarged view of a container opening and access tab located at a corner of the container.

In the illustrated embodiment (as best illustrated in FIG. 4), the peripheral openings 47 are at least partially closed by respective access closures 50 that can be removed from the container to provide access through the peripheral opening. This allows the container to be generally sealed about its periphery except at those peripheral openings 47 that are aligned with the termite tunnel as in FIG. 10. With particular reference to FIG. 13 (illustrating one access closure 50 located along the side of the termite station 21) and FIG. 14 (illustrating one access closure located at a corner of the termite station), the illustrated access closures 50 are removeably connected, and more suitably frangibly or rupturably connected to the container 23 at the peripheral openings 47 so that the closures may be removed (such as manually or by using a suitable punch tool, pliers, screw drive or other suitable tool) from the container to provide access to the interior space of the container. For example, in the embodiments of FIGS. 13 and 14, the access 50 closure is frangibly connected to the container 23 at the respective peripheral opening 47 at three connecting webs 52. The access closure 50 is generally L-shaped in cross-section, having an upstanding portion 54 that closes a portion of the peripheral opening in the side of the container 23 and a base portion 56 that closes a portion of the peripheral opening in the base panel 25 of the container. In a particularly suitable embodiment the access closure 50 is formed integrally with (e.g., molded as part of) the container 23.

It is contemplated, however, that the access closures 50 may be formed separate from and removeably connected to the container at the peripheral openings 47, such as thermal welding, adhesive or other suitable connecting technique without departing from the scope of this invention. It is also understood that in some embodiments the access closures 50 may be refastenably connected to the container 23 (such as, for example, by adhesive, hook and loop fasteners or other suitable mechanical fasteners) so that the termite station 21 can be reconfigured and reused in treating a different termite tunnel or other infestation within the scope of this invention.

Figure 15:
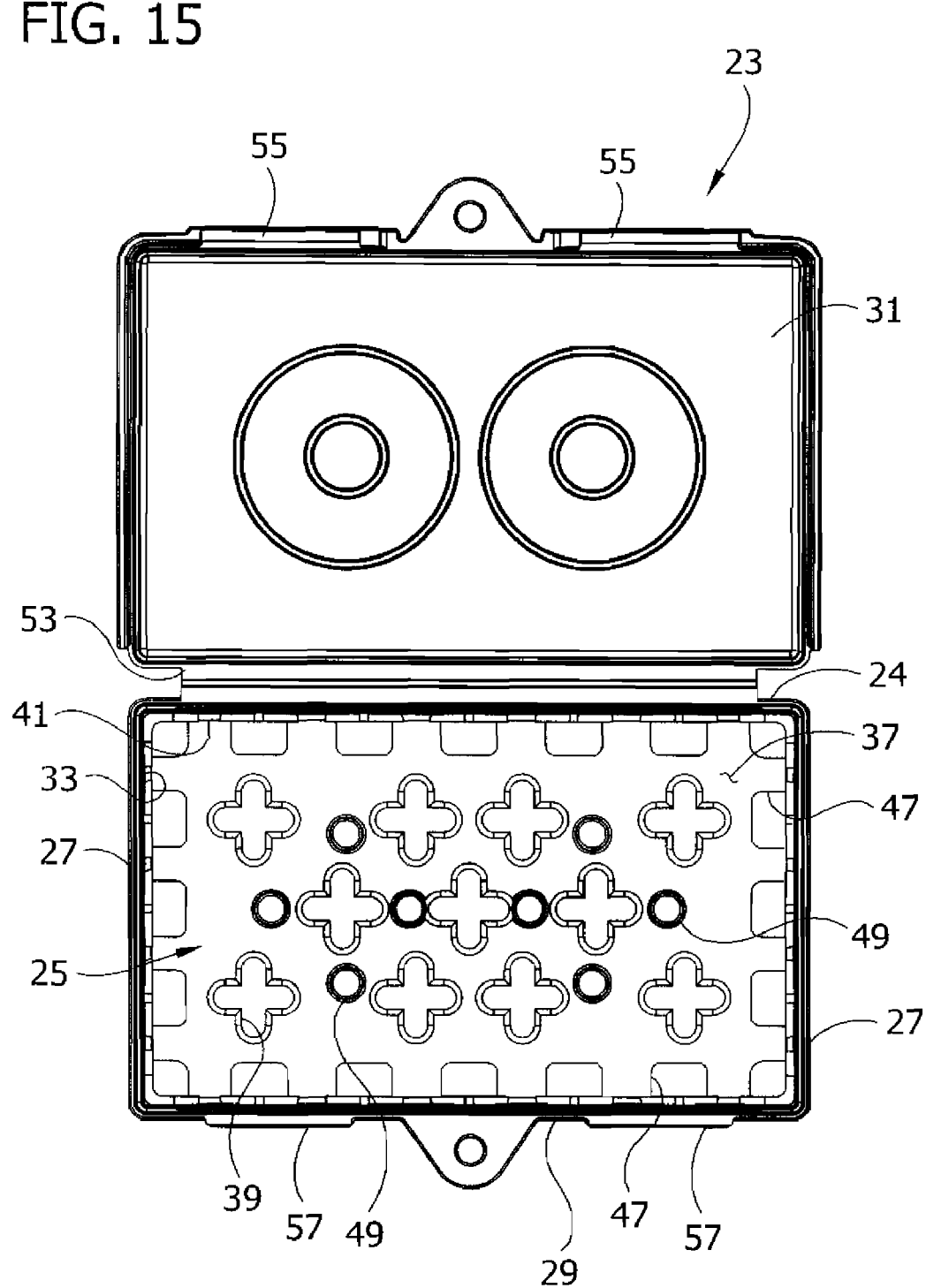
FIG. 15 is a top plan view of a termite station container according to a second embodiment of a termite station, with a lid of the container in its open position.
Figure 15B:
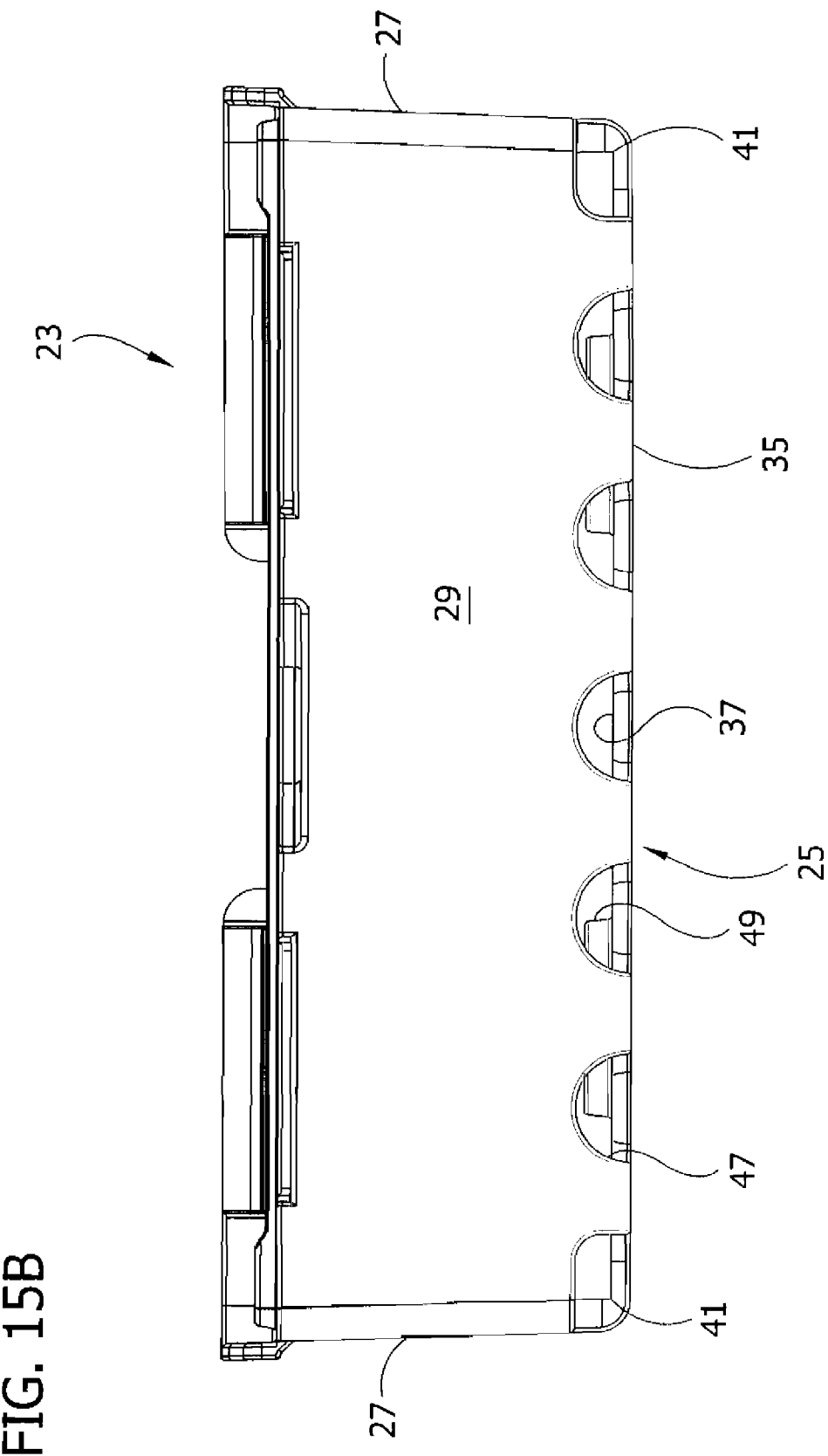
FIG. 15B is a front elevation thereof.

In another suitable embodiment, illustrated in FIGS. 15, 15A and 15B, the access closures 50 are omitted from the container 23.

One or more raised spacing elements (e.g., nubs 49 as illustrated in FIG. 3, ribs, bumps, or other suitable locating elements) are provided on the inner surface 37 of the base panel 25 so as to extend out from the plane of the base panel into the interior space 33 of the container 23. In particular, the spacing elements 49 are formed (e.g., molded in the illustrated embodiment) integrally with the base panel 25 of the container 23. However, these spacing elements 49 may alternatively be formed separate from the base panel 25 and secured to the inner surface 37 thereof, such as by adhesive, welding or other suitable securement technique without departing from the scope of this invention. It is understood, though, that these spacing elements 49 may be omitted without departing from the scope of this invention.

Figure 2:
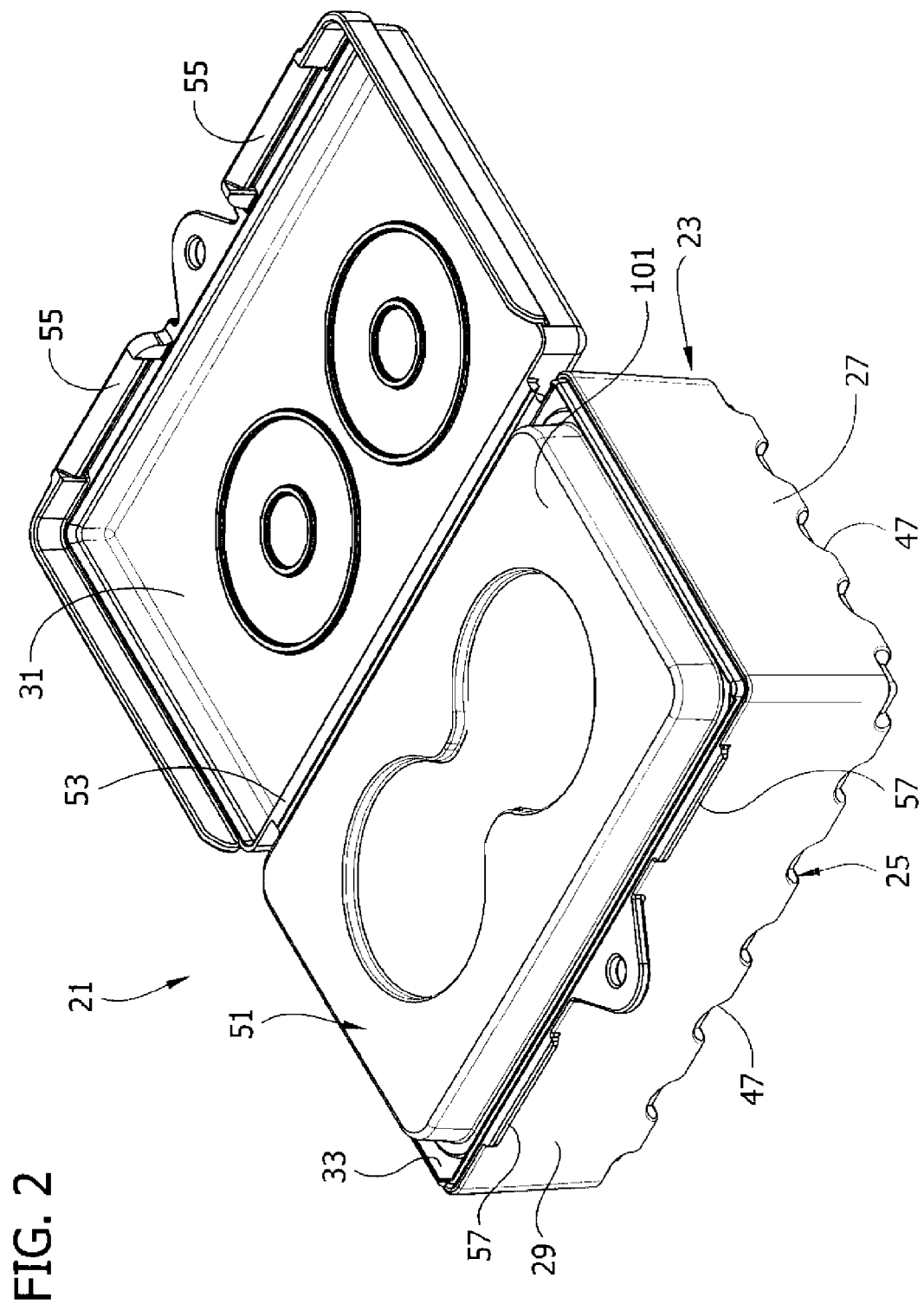
FIG. 2 is a perspective view similar to FIG. 1 with the termite station in a storage configuration thereof with a cartridge disposed in the container and the lid of the container illustrated in an open position.

Referring back to FIG. 1, the lid 31 (broadly, a closure for the container 23) is suitably positionable between a closed position (FIG. 1) and an open position (FIG. 2) in which the interior space 33 of the container 23 is accessible. More particularly, the illustrated lid 31 is hinged to the peripheral side wall of the container (e.g., to one of the container side panels 29 as in the illustrated embodiment, or to one of the end panels 27) for hinged motion relative thereto, and more suitable relative to the base panel 25, between the closed and open positions of the lid. For example, as seen in FIG. 3A, the lid 31 may be hinged to the side panel 29 in the manner of a "living hinge"—in which the lid is formed (e.g., molded) integrally with the side panel along a thinned or scored connecting web 53 that is sufficiently flexible to allow hinged motion of the lid relative to the side panel. It is understood, though, that the lid 31 may be formed separate from the end panels 27 and side panels 29 and mechanically hinged thereto by a suitable hinge mechanism (not shown) without departing from the scope of this invention. Referring to FIG. 3, a conventional latch and catch arrangement is provided (e.g., with one or more latch members 55 being provided on the lid 31 as in the illustrated embodiment and a corresponding catch or catches 57 being provided on the side panel 29 and/or end panel 27 of the container 23, or vice versa) for releasably securing the lid in its closed position.

In other embodiments, it is contemplated that the lid 31 may instead be formed separate from the rest of the container 23 and be entirely placeable on and removable from the rest of the container. It is also understood that any suitable releasable securement arrangement other than a latch and catch arrangement may be used to releasably secure the lid 31 it its closed position and remain within the scope of this invention. While in the illustrated embodiments herein the side (i.e., the end and side panels 27, 29) of the container 23 is secured to (and more suitably formed integrally with) the base panel 25, it is contemplated that the side may instead be secured to the lid 31 and hinged to the base panel 25 for positioning along with the lid between the closed and open positions thereof to provide access to the interior space 33 of the container.

Figure 6A:
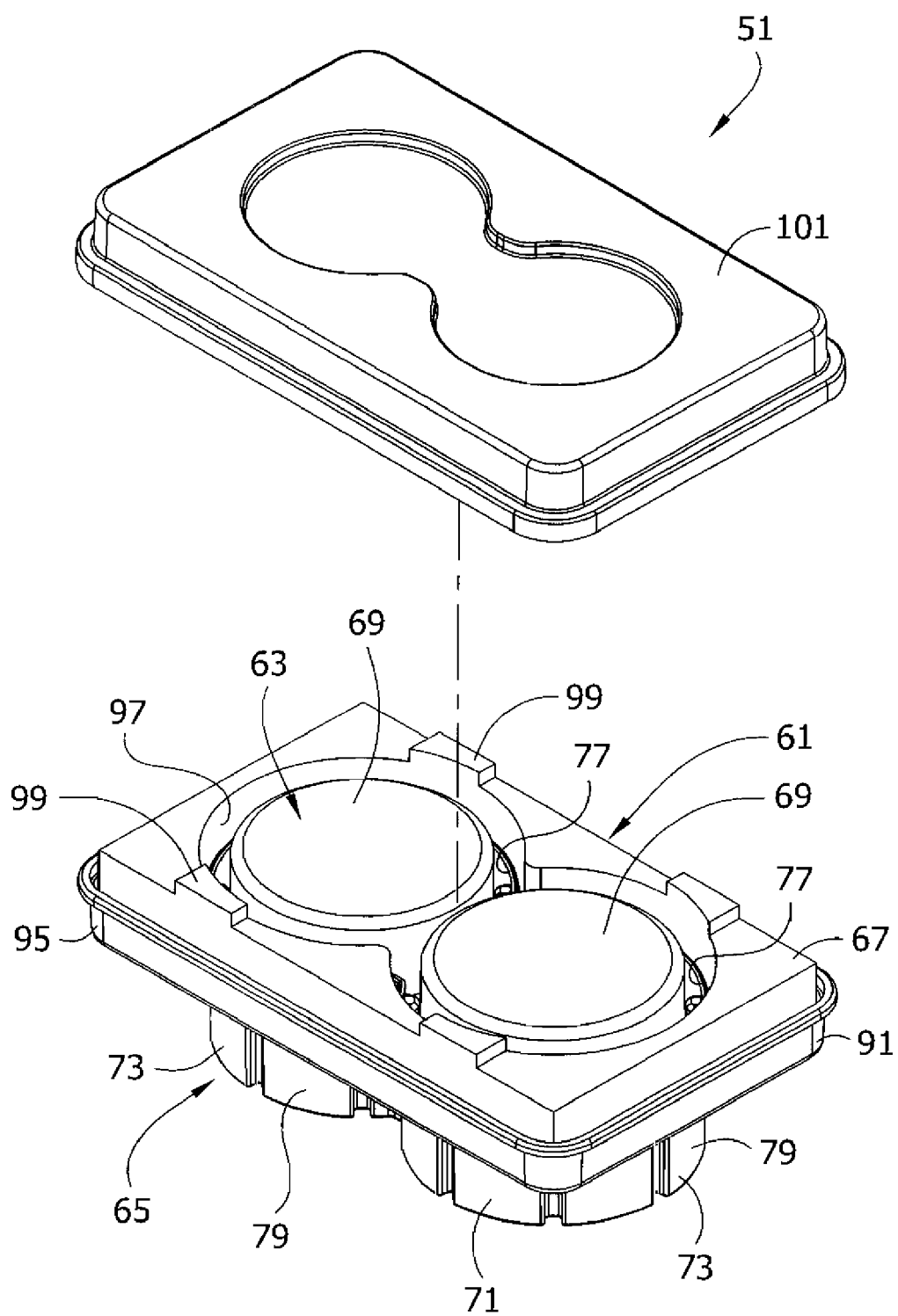
FIG. 6A is a view similar to FIG. 6 with the cartridge only partially exploded.

A cartridge 51 is suitably sized and configured for disposition at least in part within the container 23 and more suitably entirely within the interior space 33 of the container in the closed position of the container lid 31. With particular reference to FIG. 6, the cartridge 51 comprises one or more internal components, and in the illustrated embodiment all of the internal components, of the termite station 21. For example, in the illustrated embodiment the cartridge 51 comprises an aggregation member (indicated generally at 61), at least one bait matrix (indicated generally at 63) separate from the aggregation member, and a holder (indicated generally at 65) for holding the aggregation member, bait matrix and holder in assembly for insertion in and/or removal from the container 23 as a single unit. It is understood, however, that the cartridge 51 may comprise the holder 65 and only the aggregation member 61 or only the bait matrix 63 without departing from the scope of this invention. In such an embodiment, it is contemplated that the component omitted from the cartridge 51 may be disposed otherwise within the interior space 33 of the container 23 separate from the cartridge, or it may be disposed exterior of the container, or it may be omitted altogether.

The aggregation member 61 in one embodiment comprises an attractant, and more suitably what is referred to herein as a non-physical attractant. A "non-physical" attractant is intended to refer herein to an attractant that does not require physical contact by a termite to induce foraging. For example, in one particularly suitable embodiment the non-physical attractant comprises a wood that has been heat treated at an elevated temperature, such as at least about 150 degrees C. (302 degrees F.) and more suitably between about 150 degrees C. and 215 degrees C. (420 degrees F.).

Wood is an organic material found as the primary content of the stems of woody plants (e.g., trees and shrubs). Dry wood is composed of fibers of cellulose (from about 40 percent to about 50 percent by dry weight) and hemicelluloses (from about 20 percent to about 30 percent by dry weight) held together by lignin (from about 25 percent to about 30 percent by dry weight). Wood also contains extractives, which are compounds that can be extracted using various solvents and are often less than 500 grams/mole in molecular weight. In general, these extractives constitute from about two percent to about eight percent (dry weight) of the wood components.

Cellulose is the most abundant component in wood and plays a major role in giving wood its mechanical strength. A molecule of cellulose consists of β-D-glucose units bonded with β(1→4) lingages to form a long linear chain and has a molecular weight that ranges from several thousand to many million grams/mole. The molecular chains in cellulose form elementary fibrils or micelles. The micelles align with the cellulose fibrils oriented in the same direction and are tightly packed together. Cellulose elementary fibrils are then layered together in parallel with hemicelluloses and pectins in between to form microfibrils. When the microfibrils are aggregated in larger bundles and lignin impregnated within the structure, fibrils are generated, which in turn form wood fibers.

Hemicelluloses comprise from about 20 percent to about 30 percent by dry weight. Smaller than cellulose molecules, the average molecular weight of hemicelluloses range from about 10,000 grams/mole to about 30,000 grams/mole. The composition of hemicelluloses varies between hardwoods (i.e., oak, mahogany) and softwoods (i.e., pine, cedar). The hemicelluloses of hardwoods are predominantly of glucuronoxylan (from about fifteen percent to about 30 percent) and to a minor extent glucomannan (from about two percent to about five percent). The hemicelluloses of softwoods consists predominantly of galactoglucomannan (about twenty percent) and smaller amounts of arabinoglucuroxylan (from about five percent to about ten percent).

Pectins and starch are also found in wood, but typically in minor amounts, less than about one percent each. Pectins resemble hemicelluloses in structure and are found in the middle lamella, primary cell wall and tori of bordered pits and also to a small extent in the fibril structure. Starch can be found in parenchyma cells serving as storage of nutrition for the living tree, and it consists of amylase and amylopectin.

Lignin is an amorphous polymer with a wide variation in configuration. Lignin is often considered to be the glue of the wood structure. The backbone of the lignin structure is based on three types of phenyl propane units: guaiacyl, syringyl, and p-hydroxyphenyl. Softwoods consist mainly of guaiacyl units and also to some extent of p-hydroxyphenyl units. In contrast, hardwood lignins consist of syringly and guaiacyl units.

When wood is dried, these chemical compounds that make up the structure of wood undergo various changes. In particular, according to one embodiment herein, the aggregation member 61 comprises wood dried at an elevated temperature of between about 150 degrees C. (302 degrees F.) and about 215 degrees C. (420 degrees F.), whereat these chemical changes are different from those produced by drying at lower temperature ranges, such as below about 150 degrees C. (302 degrees F.). In another exemplary embodiment herein, the aggregation member 61 comprises wood that is dried at an elevated temperature of between about 185 degrees C. (365 degrees F.) and about 215 degrees C. (420 degrees F.). In particular, it is believed that the heat-treated wood undergoes changes affecting the available space for air and moisture in the wood. In particular, the porosity and permeability of the wood is changed. The porosity defines the ratio of the volume fraction of void space within a solid. The permeability defines the rate of diffusion of a fluid through a porous body.

It is believed that after such treatment the porosity may increase as liquids and other compounds not strongly bound to the structure of the wood are removed with the heating of the wood, such as by evaporation. Taken alone, this change would indicate that such heat-treated wood would be more hygroscopic than untreated wood, as there is more available space within the wood. But this conclusion ignores the changes also made to the permeability of the treated wood. Permeability exists where cells and/or voids can interconnect to one another. For example, with a hardwood, intervessel pitting can create openings in membranes, allowing for improved permeability. It is believed that after such heat treatment, however, those membranes may become occluded or encrusted. Such occlusions decrease overall permeability. Moreover, the pits may also become aspirated, whereby the wood assumes a closed-cell structure that again decreases overall permeability. It is also believed that such heat treatment can cause substantial disconnection of adjacent microfibrils within the heat-treated wood. Whereas with living or non-heat treated wood, these adjacent microfibrils provide structures for transport of liquid through the wood via normal translaminar vascular flow of phloem and xylem tissue. With their detachment, a disconnection is created within the wood that impedes the flow of liquids, thereby decreasing hygroscopy (i.e., increasing hydrophobicity). It is also believed that the increased wood shrinkage that occurs at the heat treatment temperature can lead to increased detachment of adjacent xylem tissue cells and adjacent phloem tissue cells (i.e., vascular cells), thereby inhibiting liquid passage through normal pathways of tissue cells. As would be understood by one skilled in the art, these changes depend upon the starting porosity, permeability, and density of the wood, but it is believed that such changes are generally applicable to many wood species. Moreover, such heat treatment processes may cause other changes to the structure and nature of the wood not mentioned here without departing from the scope of the embodiments of the present invention.

In addition to changes in hygroscopy and hydrophobicity, wood heat-treated in this manner also includes changes associated with other chemical compounds normally bound to the cellulose materials in the wood. While not being bound to a particular theory, it is believed that as part of the heat-treatment process, the bonds normally binding these chemical compounds (e.g., volatile, semi-volatile, and naturally-extractable compounds (e.g., aromatic compounds), such as compounds derived from tannins, terpenes, and oils, among others) to the cellulose of the wood are broken, thereby allowing movement of the compounds more readily from the wood and into the area surrounding the wood (e.g., soil), as compared with conventional wood decay. As such, these chemical compounds may be extracted, or released, and more readily spread from the wood, thereby attracting termites to the wood.

Heat-treatment of wood in this manner generally proceeds as follows. First, the wood is dried to remove a substantial portion of the liquid from the wood. In one embodiment, the drying process occurs in a range from about 110 degrees C. (230 degrees F.) to about 175 degrees C. (345 degrees F.). The dried wood is then heated to and maintained at an elevated temperature, such as between about 150 degrees C. (302 degrees F.) and about 215 degrees C. (420 degrees F.), and more suitably between about 185 degrees C. (365 degrees F.) and about 215 degrees C. (420 degrees F.). It is contemplated that in other embodiments the elevated temperature at which the wood is heat-treated may exceed 215 degrees C. (420 degrees F.) as long as the temperature remains below the ignition temperature of the wood specimen to inhibit charring or burning of the treated wood. The treated wood is suitably maintained at this temperature for a time sufficient to undergo the changes described above. In one exemplary embodiment, the wood is maintained at the elevated temperature for between about two hours and about three hours. The dried wood material is then cooled by a suitable cooling method such as air cooling, liquid cooling or other know method.

In one exemplary embodiment, the dried heat-treated wood may then be partially rehydrated to increase the liquid content of the cellulose material to levels of between about one percent and about eighteen percent. In still another exemplary embodiment, the heat-treated wood may be partially rehydrated to levels of between about one percent and about ten percent. In yet another exemplary embodiment, the dried wood material may be partially rehydrated to levels of between about two percent and about ten percent. It is understood, however, that the heat-treated wood need not be partially rehydrated, such that the liquid content in the dried wood is less than about one percent, without departing from the scope of this invention.

Experiment

In this experiment, samples of aspen wood heat-treated according to one suitable embodiment and conventionally-treated aspen wood were evaluated to determine *Reticulitermues flavipes* termite feeding preference between these wood samples.

The heat-treated wood was processed as follows. The wood was cut to a common board dimension, such as a standard 2×4 plank (i.e., cross section of about 38 millimeters (1.5 inches) by about 89 millimeters (3.5 inches)). The wood was then placed within a kiln or high temperature/pressure vessel. The temperature within the vessel was increased rapidly to about 100 degrees C. (212 degrees F.) and held until the wood uniformly reached approximately zero percent moisture content. The temperature was then steadily increased to and maintained at about 185 degrees C. (365 degrees F.) for a period of about 120 to 180 minutes. After drying, the temperature of the wood was decreased to between about 80 degrees C. (176 degrees F.) and about 90 degrees C. (194 degrees F.). A steam spray was used during the cooling period to reduce the temperature of the wood and to increase the moisture content of the wood to between two percent and about ten percent. The entire heating and cooling down process took approximately 36 hours to complete.

The conventionally-treated aspen wood was kiln dried at a temperature of about 85 degrees C. (185 degrees F.) and about 90 degrees C. (195 degrees F.) for about five to six days. After drying, the conventionally-treated aspen wood was allowed to cool to ambient.

The experiment was conducted utilizing both a choice and a no-choice laboratory bioassay. The purpose of the study was to determine the preference, based upon association and/or consumption, between the two wood samples described above. With the choice laboratory bioassay, 300 termites by weight with 20 grams (0.7 ounce) of sand at 12% moisture were added to a petri dish with an average weight across all replications of an approximately 4 gram (0.141 ounce) portion of the two types of wood located in respective opposite halves of the petri dish. The termites were placed between the portions of wood and were allowed to move to and consume the wood they preferred. After 31 days, the termites on or near each of the pieces of wood were counted. In addition, the termites were removed from the wood and the wood weighed to determine the amount consumed. This choice test was repeated seventeen times with seventeen sets of 300 termites and new wood samples.

For the no-choice bioassay, 300 termites by weight with 20 grams (0.7 ounce) of sand at 12% moisture were added to a petri dish with an average weight across all replications of an approximately 4 gram (0.141 ounce) portion of one of the wood samples. The termites were placed across from the portion of wood and were allowed to move freely within the test chamber and consume the wood. After 31 days, the termites were removed from the wood and the wood weighed to determine the amount consumed. This choice test was repeated five times with five sets of 300 termites and new wood samples for each of the two different types (heat-treated and conventionally treated) of wood samples.

With respect to consumption in the choice bioassay, the wood heat-treated at elevated temperatures realized a mean consumption rate of 19.0 milligrams per gram of termites per day (19.0 milliounces per ounce of termites per day) with a standard deviation of 2.9 over the seventeen choice tests. In contrast, the conventionally-treated wood realized a consumption rate of 15.1 milligrams per gram of termites per day (15.1 milliounces per ounce of termites per day) with a standard deviation of 5.0 over the seventeen choice tests. In the no-choice bioassay, the wood heat-treated at elevated temperatures realized a consumption rate of 42.4 milligrams per gram of termites per day (42.4 milliounces per ounce of termites per day) with a standard deviation of 1.6 over the five no-choice tests. In contrast, the conventionally-treated wood realized a consumption rate of 37.5 milligrams per gram of termites per day (37.5 milliounces per ounce of termites per day) with a standard deviation of 5.6 over the five no-choice tests. Thus, for both the choice and no-choice bioassays, the wood that was heat-treated at elevated temperatures realized greater consumption rates than the conventionally-treated wood.

Moreover, when considering association, rather than consumption, the mean number of termites over the seventeen choice bioassay tests located in the half of the petri dish including the wood that was heat-treated at elevated temperatures was 183, with a standard deviation of 34. In contrast, the mean number of termites located in the other half of the petri dish including the conventionally-treated wood was 72, with a standard deviation of 40. Of the 300 termites included in each experiment, a mean of 47 died during the experiment. This result occurred even though the wood that was heat-treated at elevated temperatures was significantly drier, having less internal moisture content, than the conventionally-treated wood. This indicates, rather unexpectedly, that the reduced moisture content of the wood heat-treated at elevated temperatures did not deter the termites from feeding on the wood and even more unexpectedly it attracted more of the termites due to the physical and/or chemical characteristics of the wood. Termites in this study demonstrated significantly greater attraction to or preference for the wood heat-treated at elevated temperatures as compared to the conventionally treated wood.

Figure 16:
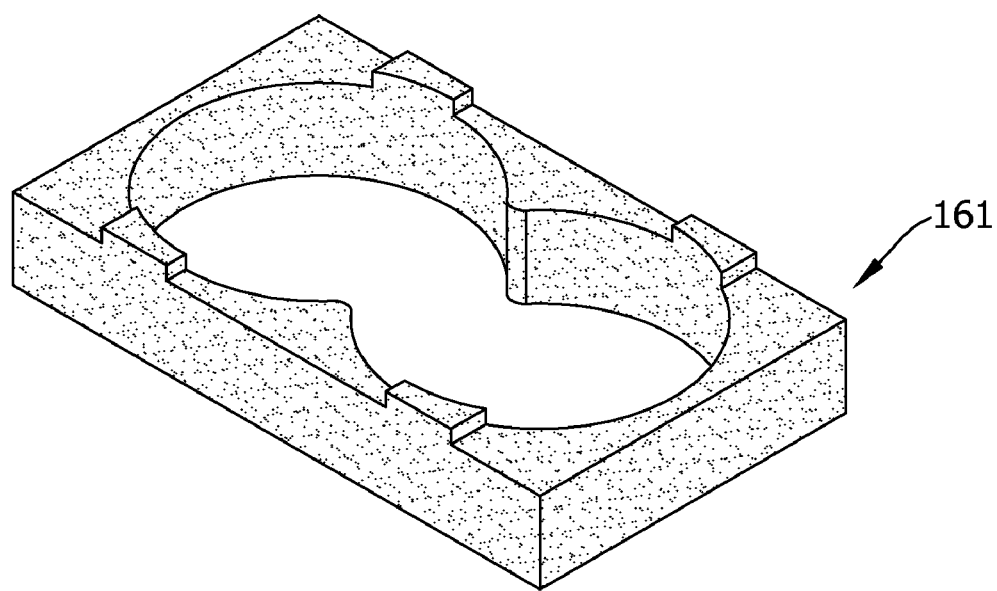
FIG. 16 is a perspective view of another embodiment of an aggregation member.

In view of the above Experiment, the increased non-physical attraction and association preference of the wood heat-treated at elevated temperatures may significantly enhance the efficacy of a termite monitoring and/or baiting station that includes such a wood. As a more particular example, the illustrated aggregation member 61 comprises a solid wood block 67 that has been heat-treated at elevated temperatures as discussed above. It is understood, though, that the heat-treated wood from which the aggregation member 61 is made may alternatively be in a mulch form, a powder form or other suitable form. The aggregation member 61 is also suitably free from toxicant. For example, the above-described heat-treated wood has no added or natural toxicants. FIG. 16 illustrates another embodiment of an aggregation member, indicated generally at 161. The aggregation member 161 is similar to or the same as the aggregation member 61 except that it is made from heat-treated wood that is in particulate form such as a compressed cellulose powder.

In other embodiments, it is contemplated that the aggregation member 61 may instead comprise a non-toxic physical attractant, i.e., an attractant that once contacted by a termite promotes further foraging by termites. Suitable examples of such physical attractants include, without limitation, paper, cardboard, wood (e.g., other than wood that has been heat-treated in as described above) and other cellulose materials. Additionally an agar matrix alone or combined with sugars (i.e., xylose, mannose, galactose) and/or purified cellulose materials may be used as the aggregation member 61 to attract termites due to its moisture content and/or feeding attractant.

The bait matrix 63 suitably comprises a non-toxic attractant and may or may not carry a toxicant for eliminating or suppressing termite infestations. As one example, the illustrated bait matrix 63 comprises a purified cellulose powder compressed into one or more tablets 69. Without toxicant added to the bait matrix 63, the bait matrix may be suitably used to monitor for the presence of termites in the area of the termite station 21. Toxicant, if added to the bait matrix 63, is suitably one or more of a delayed-action type toxicant, or an insect growth regulator, pathogen or metabolic inhibitor. One such toxic bait matrix 63 is disclosed in co-assigned U.S. Pat. No. 6,416,752 entitled "Termite Bait Composition and Method", the entire disclosure of which is incorporated herein by reference. It is understood that other suitable known monitoring and/or toxic bait matrix materials and/or compositions may used without departing from the scope of this invention. In the illustrated embodiment, four such toxic bait matrix tablets 69 are used in the cartridge 51. However, it is contemplated that any number of bait matrices, including a single bait matrix, may be used without departing from the scope of this invention.

Figure 7:
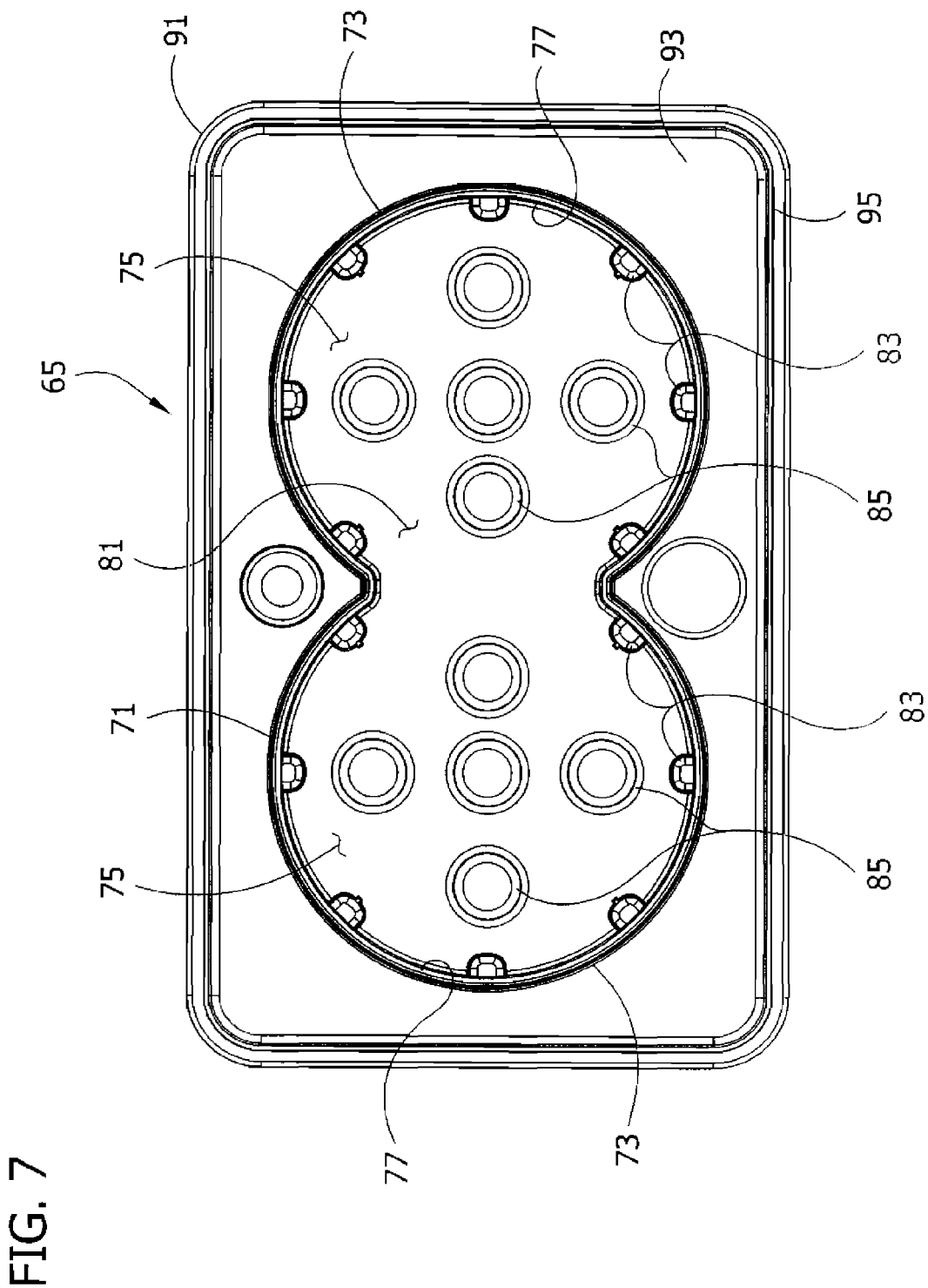
FIG. 7 is a top plan view of a holder of the cartridge, a cover, an aggregation member and a bait matrix of the cartridge having been omitted to reveal internal construction of the holder.
Figure 8:
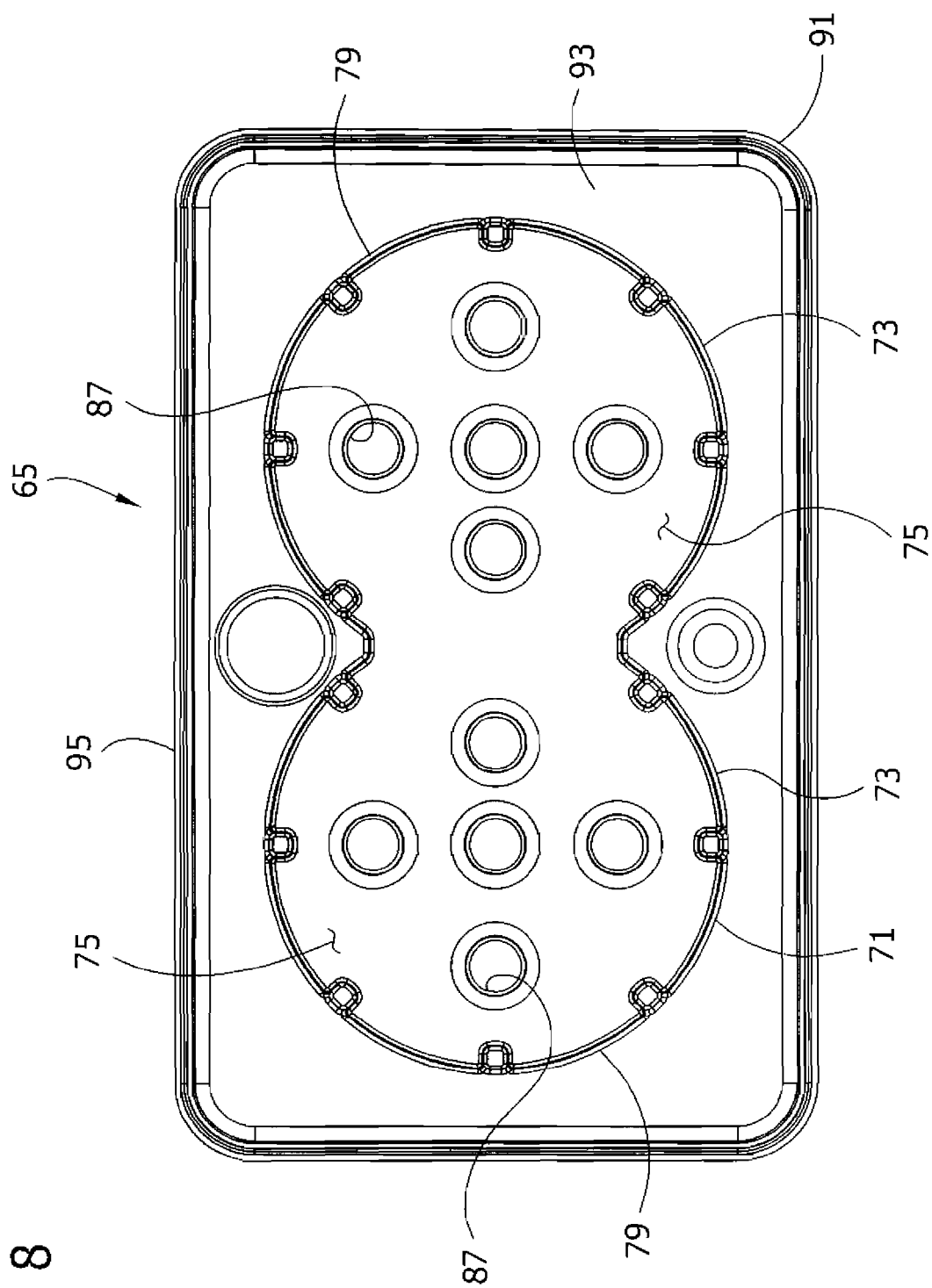
FIG. 8 is a bottom plan view of the cartridge holder.

The illustrated cartridge holder 65 comprises a cup portion 71 configured generally as a pair of cylindrical cups 73 (e.g., each having a closed end 75, an open end 77 and a side wall 79 extending therebetween) with overlapped segments so that the cup portion defines a generally 8-shaped bait matrix pocket 81. The pocket 81 is suitably sized and configured for at least receiving, and more suitably for receiving and retaining, the bait matrix 63 therein and more suitably for receiving and retaining one or more of the illustrated circular tablets 69 therein. For example, the figure 8-shaped pocket 81 of FIGS. 6 and 7 is suitably capable of receiving and retaining therein at least two circular bait matrix tablets 69 arranged in side-by-side relationship (e.g., one in each generally cylindrical cup 73 that defines the pocket), and is more suitably sized (e.g., in depth) to receive a stacked pair of the tablets in each of the cups, with the exposed surfaces of the uppermost bait matrix tablets being generally flush with the open ends 77 of the cups. It is understood, however, that the pocket 81 may be shaped other than as illustrated in FIG. 7 and that the tablets 69 or other bait matrix disposed in the pocket may be shaped other than circular without departing from the scope of the invention. Additionally, it is contemplated that the cartridge holder 65 may comprise two or more separate pockets instead of the single pocket 81 illustrated in FIG. 7.

A plurality of projections, such as in the form of ribs 83 in the illustrated embodiment, are disposed lengthwise along the inner surface of each cup side wall 79 to extend laterally inward of the pocket 81 formed by the generally cylindrical cups 73. For example, the ribs 83 illustrated in FIGS. 6 and 7 extend lengthwise from the closed end 75 of the cup 73 to the open end 77 thereof and project sufficiently inward from the inner surface of the cup side wall 79 to provide an interference, or friction fit of the bait matrix tablets 69 within the pocket 81 to positively retain the tablets in the pocket. It is understood, though, that the ribs 83 need not extend the full length from the closed ends 75 to the open ends 77 of the cups 73 to remain within the scope of this invention. It is also contemplated that a greater or lesser number of ribs 83 or other suitable projections may be used to retain the bait matrix 61 or matrices within the cartridge holder pocket 81. Standoff elements in the form of a plurality of nubs 85 (FIGS. 6 and 7) are provided on the inner surface of the cup portion 71 at the closed end 75 of each of the cups 73 to extend into the respective pocket 81. The standoff elements 85 space the tablets 69 from the closed ends 75 of the cups 73 to allow termites to move therebetween within the pocket 81. In a particularly suitable embodiment, the standoff elements 85 are provided by corresponding sockets 87 (FIG. 8) formed in the outer surface of the closed end 75 of each of the cups 73. These sockets 87 are configured and arranged to receive the spacing elements 49 that extend out from the inner surface 37 of the base panel 25 to allow the cartridge to seat sufficiently into the container 23 in the storage configuration of the termite station 21 so that the lid of the container can be closed.

Still referring to FIGS. 6 and 7, the cartridge holder 65 also has a generally rectangular tray portion 91 formed integrally with and extending around the cup portion 71 of the cartridge holder to receive, and more suitably to receive and retain the aggregation member 61 in the cartridge holder. A support panel 93 (e.g., bottom) of the illustrated tray portion 91 (which also includes a peripheral side wall 95 defining the depth of the tray portion) is suitably spaced lengthwise from the open ends 77 of the generally cylindrical cups 73 so that the aggregation member 61 held by the tray portion at least in part surrounds the cups in which the bait matrix 63 is disposed. It is contemplated, however, that the support panel 93 of the tray portion 91 may be located at substantially any position between the closed ends 75 and the open ends 77 of the cups 73 without departing from the scope of the invention. In one particularly suitable embodiment, the aggregation member 61 and the tray portion 91 of the holder 65 are sized relative to each other to provide an interference or friction fit of the aggregation member in the tray portion to thereby retain the aggregation member in the holder. As best seen in FIG. 6, the heat-treated wood block 67 that defines the aggregation member 61 of the illustrated embodiment is generally rectangular and has a central opening 97 so that when seated in the tray portion 91 of the holder 65 the wood block surrounds the cups 73 of the cup portion 71 proximate the open ends 77 of the cups while leaving centrally exposed the bait matrix tablets 69.

Suitable spacing structure is provided to space at least a portion of the aggregation member 61 from the base panel 25 in what is referred to herein as an operating configuration (FIG. 9) of the termite station 21 to permit termites to readily move between the aggregation member and the base panel. For example, in the illustrated embodiment of FIG. 6 the spacing structure comprises four standoff elements 99 secured to and more particularly formed integrally with the heat-treated wood block 67. It is understood that more or less than the four illustrated standoff elements 99 may be provided. The spacing structure may alternatively be formed into the aggregation member 61, such as grooves, slots or other voids formed in the outer surface of the wood block 67, so that less than the entire outer surface of the wood block (e.g., where the grooves, etc. are located) lies against the base panel 25 in the operating configuration of the termite station 21. In other contemplated embodiments, suitable spacing structure may be formed integrally with the inner surface 37 of the base panel 25, or it may be formed separate from and attached thereto, at one or more locations contacted by the aggregation member 61 in the operating configuration of the termite station 21. While less preferred, it is also understood that other suitable spacing structure may be formed and remain separate from both the cartridge 51 and the container 23 and disposed therebetween in the container to space at least a portion of the aggregation member 61 from the base panel.

Figure 9:
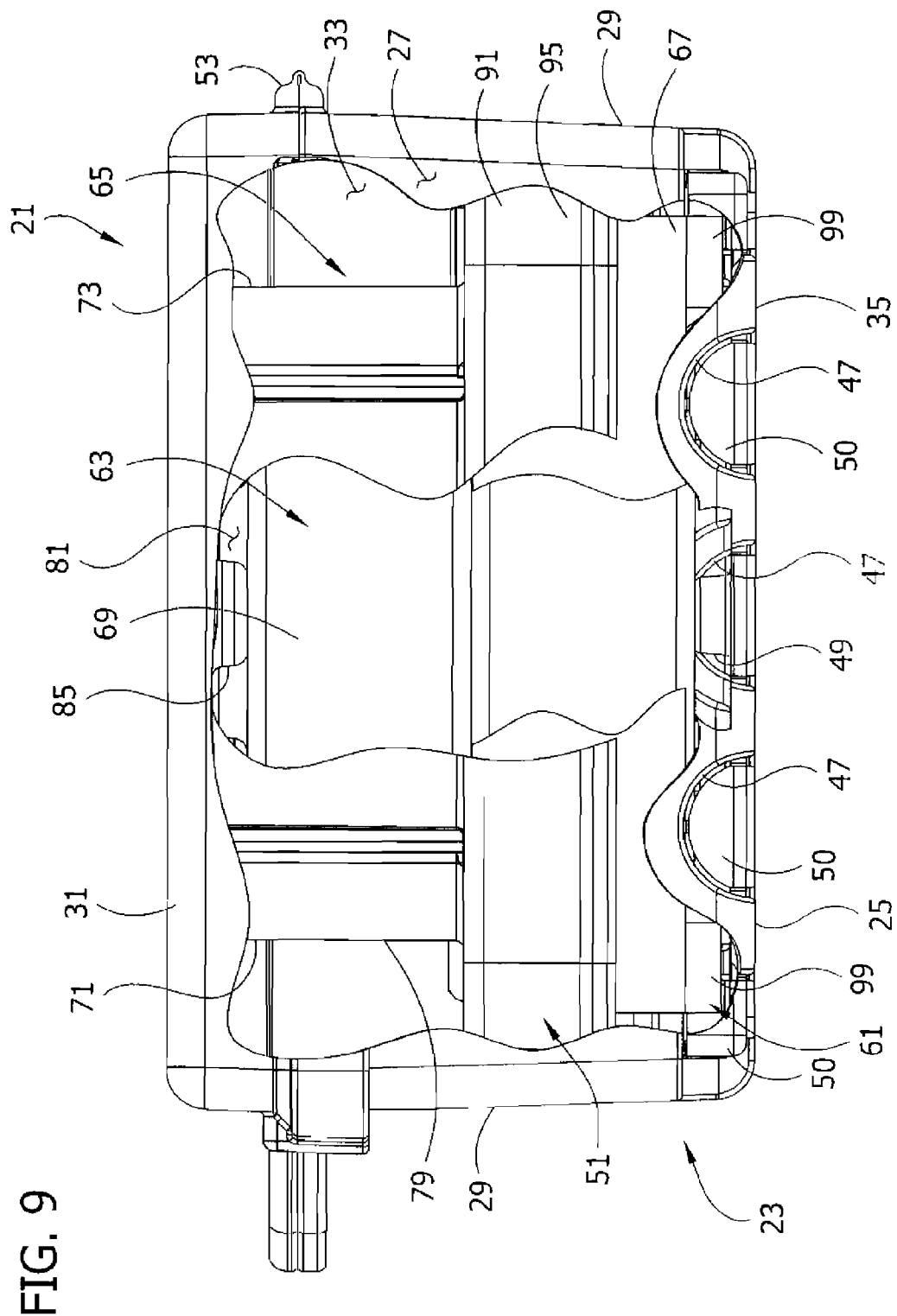
FIG. 9 is a side elevation of the termite station in an operating configuration thereof, with the lid in its closed position and with a side panel of the container and portions of the cartridge holder and cover broken away, and with an access tab removed from the container.

As best seen in FIG. 9, the spacing structure (e.g., standoff elements 99 in the illustrated embodiment) spaces the outer surface of the aggregation member 61 (which faces the inner surface 37 of the base panel 25 in the operating configuration of the termite station 21) a distance sufficient to allow termites to move freely (i.e., without having to forage through the aggregation member) between the aggregation member and the base panel. More suitably, the spacing between the aggregation member 61 and the base panel 25 is such that the termite's antennae can remain in contact with the aggregation member as the termite moves past the aggregation member. As an example, the spacing structure in one embodiment may space the aggregation member 61 from the base panel 25 a distance in the range of about 0.20 cm to about 0.6 cm. The spacing elements 49 on the base panel 25 suitably space the bait matrix 63 (e.g., tablets 69) from the base panel to allow movement of termites between the base and the bait matrix.

As best seen in FIGS. 1 and 6, the cartridge 51 may optionally comprise a cover 101 adapted for releasable securement to the aggregation member 61 and/or the cartridge holder 65, and more suitably to the peripheral side wall 95 of the tray portion 91 of the cartridge holder to define an interior space of the cartridge in which the aggregation member and bait matrix 63 are disposed so as to reduce their exposure to air and other environmental conditions. It is understood, however, that the cover 101 may be omitted from the cartridge 51 without departing from the scope of this invention.

With reference again to FIGS. 1 and 2, in a storage configuration of the termite station 21 the cartridge 51 is disposed within the interior space 33 of the container 23 with the outer surfaces of the closed ends 75 of the cartridge holder cups 73 facing the inner surface 37 of the base panel 25 such that the cartridge cup portion sockets 81 receive the base panel spacing members 49 to position the cartridge within the container. The cover 101 of the cartridge 51 thus faces the lid 31 of the container 23 in this configuration with the lid in its closed position. To mount the termite station 21 on a desired mounting surface M, the container lid 31 is moved to its open position to provide access to the interior space 33 of the container 23 and the cartridge 51 is removed from the container. With the lid 31 open and the cartridge 51 removed as illustrated in FIG. 10, the outer surface 35 of the base panel 25 is placed against the mounting surface M and suitable fasteners 43 are used (i.e., extending through the base panel openings 39) to secure the base panel (and hence the container 23) on the mounting surface. If the cartridge 51 is to be further stored in the storage configuration of the termite station 21, it is simply placed back into the container 23 in the prescribed orientation and the lid 31 is secured back in its closed position.

To use the termite station 21 for monitoring and/or treating against termite infestation, the lid 31 is opened and the cartridge 51 is removed from the container 23. The cartridge cover 101 (if present) is removed from the cartridge 51 to expose the aggregation member 61 and bait matrix tablets 69. The cartridge 51 is re-inserted, open end first, into the container 23 so that the aggregation member 61 now faces the base panel 25 and is otherwise spaced from the base panel by the standoff elements 99 (broadly, spacing structure) and the bait matrix tablets 69 are spaced from the base panel by spacing elements 49 as illustrated in FIG. 9. The lid 31 is then secured in its closed position to fully enclose the cartridge 51 in the container 23, thereby defining the operating configuration of the termite station 21. The aggregation member 61 (e.g., the heat-treated wood block 67 in the illustrated embodiment), bait matrix 63 (e.g., the bait matrix tablets 69) and cartridge holder 65 are sized and configured relative to each other such that the aggregation member is nearer to the base panel 25 than the bait matrix and is also nearer both laterally and longitudinally to the peripheral openings 47 formed in the end and side panels 27, 29 than the bait matrix in the operating configuration of the termite station.

In operation, with the termite station 21 configured in its operating configuration, as termites approach the base panel 25 from outside the container 23, either from behind the base panel or from the sides of the container, they quickly enter through the openings 39 formed in the base panel or through the peripheral openings 47 formed in the end and/or side panels 27, 29 where the corresponding access panels removed. The placement and arrangement of the aggregation member 61 relative to the bait matrix 63 (i.e., nearer to the base panel 25, end panels 27 and side panels 29 than the bait matrix) results in the termites first encountering the aggregation member after entering the interior space 33 of the container. Where the aggregation member 61 is a non-physical attractant, such as the previously described heat-treated wood block 67, the termites may even be lured or drawn by the aggregation member into the termite station 21. The termites, induced by the aggregation member 61 to forage further within the container 23, ultimately discover and are induced to consume the bait matrix 63.

Where the bait matrix 63 is free from toxicant and is used instead for monitoring, the termites leave visual evidence of attacking the bait matrix, such as exploratory tunnels built by termites as they consume the bait material so that signs of termite infestation are left on the surface of the material, or mud tubing constructed across the surface of the material or into the cup portion of the cartridge holder. By adding toxicant to the bait matrix 63, foraging termites ingest the toxicant-containing bait and return portions of the bait to the nest through the pre-existing network of passageways, thereby effectively treating against the infestation.

It is expected that over time the need to replace to the cartridge 51 will arise, such as following long periods of non-infestation and exposure to environmental conditions, or following prolonged periods of infestation in which a substantial amount of the bait matrix 63 (e.g., the tablets 69 of the illustrated embodiment) is consumed. The cartridge 51 may be replaced by opening the lid 31, removing the old cartridge (e.g., as a single unit) and inserting a new one that includes a new aggregation member 61 and new tablets 69. Alternatively, if a new aggregation member 61 is not needed, just the bait matrix 63 (e.g., the tablets 69) may be replaced in the old cartridge 51 and the old cartridge reinserted back into the container 23. Because the aggregation member 61, bait matrix 63 and holder 65 are held in assembly as a single unit, the entire cartridge 51 is readily replaced without having to reach into the termite station 21, i.e., only the cup portion 71 of the holder 65 need be grasped and pulled outward to remove the cartridge from the container 23.

While in the illustrated embodiments herein the termite station 21 is in the form of an above-ground termite station, it is understood that the aggregation member 61 comprising the wood heat-treated at elevated temperatures as described herein may be used in an in-ground, or subterranean termite station. One example of a suitable subterranean termite station is illustrated and described in co-assigned U.S. Pat. No. 7,086,196 entitled Pest Control Device And Method, issued Aug. 8, 2006, the entire disclosure of which is incorporated herein by reference to the extent it is consistent herewith. In such a termite station, a housing having an open top is placed into the ground, followed by an aggregation base (which in one embodiment herein may comprise the wood heat-treated at elevated temperatures as described above) and a bait container that contains a bait matrix. Alternatively the bait matrix may be disposed in the housing without being contained in the bait container.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of monitoring termite populations in an area accessible to the termites, said method comprising:
   locating in said area a wood that has been heat-treated to a temperature of greater than about 150 degrees C. (302 degrees F.), said wood being a termite attractant; and
   monitoring said heat-treated wood for the presence of termites.

2. The method set forth in claim 1 wherein the heat-treated wood has a lower moisture content than at least one of (i) untreated wood of the same species and (ii) wood of the same species heat-treated to less than about 150 degrees C. (302 degrees F.).

3. The method set forth in claim 2 wherein the heat-treated wood has a moisture content at least twenty percent less than wood of the same species heat-treated to less than about 90 degrees C. (195 degrees F.).

4. The method set forth in claim 1 wherein the heat-treated wood has a moisture content of less than about ten percent.

5. The method set forth in claim 1 wherein the heat-treated wood has a moisture content in the range of about one to about ten percent.

6. The method set forth in claim 1 wherein the heat-treated wood is in a particulate form.

7. The method set forth in claim 6 wherein the heat-treated wood comprises compressed cellulose powder.

8. The method set forth in claim 1 wherein the locating step comprises one of a) placing said heat-treated wood in a cavity in the ground and b) placing a housing in a cavity in the ground and placing said wood in an interior space of the housing.

9. The method set forth in claim 1 wherein the locating step comprises one of a) mounting said heat-treated wood on an above-ground surface and b) mounting a container on a mounting surface wherein the container has an interior space, and placing said heat treated wood in the interior space of the container.

10. The method set forth in claim 1 wherein the heat-treated wood has been heat-treated to a temperature of at least about 185 degrees C. (365 degrees F.).

11. The method set forth in claim 9 where the locating step comprises mounting a container on an above-ground mounting surface, the container having an interior space, and placing a cartridge in the interior space of the container, the cartridge comprising a holder in which the heat-treated wood is held for insertion of the holder and wood into the interior space of the container as a single unit.

12. The method set forth in claim 11 wherein the method is further for controlling termite populations in said area, the method further comprising the step of locating a toxic bait in the interior space of the container.

13. The method set forth in claim 12 wherein the toxic bait locating step comprises locating the toxic bait in the cartridge for insertion of the holder, the heat-treated wood and the toxic bait into the interior space of the container as a single unit.

14. A method of monitoring and controlling termite populations in an area accessible to said termites, said method comprising:
locating in said area a wood that has been heat-treated to a temperature of at least about 150 degrees C. (302 degrees F.), said wood being a termite attractant; and
locating a toxic bait in said area.

15. The method set forth in claim 14 wherein the step of locating the toxic bait in said area comprises removing said heat-treated wood from said area and replacing said heat-treated wood with said toxic bait.

16. The method set forth in claim 14 wherein the step of locating the toxic bait in said area comprises locating said toxic bait adjacent to said heat-treated wood in said area.

17. The method set forth in claim 14 further comprising locating a housing in a cavity in the ground, the housing having an interior space, the heat-treated wood locating step comprising positioning the heat-treated wood in said interior space of said housing, the toxic bait locating step comprising placing said toxic bait in said interior space of said housing adjacent to said heat-treated wood.

18. The method set forth in claim 14 wherein the heat-treated wood has been heat-treated to a temperature of at least about 185 degrees C. (365 degrees F.).

19. The method set forth in claim 14 wherein the heat-treated wood has a lower moisture content than at least one of (i) untreated wood of the same species and (ii) wood of the same species heat treated at less than 150 degrees C. (302 degrees F.).

20. The method set forth in claim 19 wherein the wood has a moisture content at least twenty percent less than wood of the same species heat-treated at less than about 90 degrees C. (195 degrees F.).

21. The method set forth in claim 14 wherein the heat-treated wood has a moisture content of less than about ten percent.

22. The method set forth in claim 14 wherein the heat-treated wood has a moisture content in the range of about one to about ten percent.

23. A method of controlling termite populations in an area accessible to said termites, said method comprising:
locating in said area a bait comprising wood that has been heat-treated to a temperature of at least about 150 degrees C. (302 degrees F.) and a toxicant, said wood being a termite attractant.

24. The method set forth in claim 23 further comprising locating a housing in a cavity in the ground, the housing having an interior space, the bait locating step comprising positioning the toxic bait in said interior space of said housing.

25. The method set forth in claim 23 wherein the wood has been heat-treated to a temperature of at least about 185 degrees C. (365 degrees F.).

26. The method set forth in claim 23 wherein the wood has a moisture content of less than about ten percent.

27. The method set forth in claim 23 wherein the wood has a moisture content in the range of about one to about ten percent.

28. The method set forth in claim 1 wherein the wood is aspen.

* * * * *

UNITED STATES PATENT AND TRADEMARK OFFICE
CERTIFICATE OF CORRECTION

| | |
|---|---|
| PATENT NO. | : 8,387,306 B2 |
| APPLICATION NO. | : 11/770379 |
| DATED | : March 5, 2013 |
| INVENTOR(S) | : James Cink |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this
Fourth Day of November, 2014

Michelle K. Lee
*Deputy Director of the United States Patent and Trademark Office*